US012624742B2

(12) United States Patent
Jing

(10) Patent No.: US 12,624,742 B2
(45) Date of Patent: May 12, 2026

(54) MULTI-DEGREE ANTI-VIBRATION UNIT

(71) Applicant: City University of Hong Kong, Kowloon (HK)

(72) Inventor: Xingjian Jing, Sha Tin (HK)

(73) Assignee: City University of Hong Kong, Kowloon (HK)

( * ) Notice: Subject to any disclaimer, the term of this patent is extended or adjusted under 35 U.S.C. 154(b) by 188 days.

(21) Appl. No.: 17/954,517

(22) Filed: Sep. 28, 2022

(65) Prior Publication Data

US 2024/0117857 A1  Apr. 11, 2024

(51) Int. Cl.
| | |
|---|---|
| *B23Q 11/00* | (2006.01) |
| *B60N 2/52* | (2006.01) |
| *F16F 15/067* | (2006.01) |
| *F16M 11/22* | (2006.01) |

(52) U.S. Cl.
CPC ........... *F16F 15/067* (2013.01); *F16M 11/22* (2013.01); *B23Q 11/0035* (2013.01); *B60N 2/522* (2013.01)

(58) Field of Classification Search
CPC .... B23Q 11/0035; B60N 2/522; B60N 2/505; B60N 2/508; B60N 2/54
USPC ....... 248/559, 562, 564, 565, 566, 578, 582, 248/583, 584, 586, 588, 636
See application file for complete search history.

(56) References Cited

U.S. PATENT DOCUMENTS

| | | | | |
|---|---|---|---|---|
| 8,441,615 B2 * | 5/2013 | Hashemi | ................. | F16F 15/06 |
| | | | | 355/75 |
| 8,833,723 B2 * | 9/2014 | Cummins | ............... | F16F 15/02 |
| | | | | 248/618 |
| 2024/0117856 A1 * | 4/2024 | Jing | ....................... | F16M 11/22 |

OTHER PUBLICATIONS

G. Gatti, Statics and dynamics of a nonlinear oscillator with quasi-zero stiffness behaviour for large deflections, Commun. Nonlinear Sci. Numer. Simul. 83 (2020) 105143.
H. Ding et al., Nonlinear vibration of a slightly curved beam with quasi-zero-stiffness isolators, Nonlinear Dyn. 95 (2019) 2367-2382.
A. Carrella et al., On the force transmissibility of a vibration isolator with quasi-zero-stiffness, J. Sound Vib. 322 (2009) 707-717.

(Continued)

*Primary Examiner* — Alfred J Wujciak
(74) *Attorney, Agent, or Firm* — Norton Rose Fulbright US LLP

(57) ABSTRACT
Anti-vibration units are provided for vibration suppression in multiple directions. The anti-vibration units may have an X-shaped structure as part of its support structure. The anti-vibration units can work for ultra-low frequency vibration isolation in three directions in a passive manner. The anti-vibration units can achieve a flexible nonlinear stiffness, which contains zero or quasi-zero stiffness, negative stiffness and positive stiffness. A smooth multi-equilibria state is also achievable. Compared with traditional spring-mass-damper (SMD) and typical QZS systems, the provided anti-vibration units can have an enhanced QZS range of larger stroke with guaranteed loading capacity, and can also achieve a lower resonant frequency with a lower resonant peak. At least some embodiments of the anti-vibration units may include a new and innovative arrangement of components that enables a more compact design than typical anti-vibration systems.

14 Claims, 22 Drawing Sheets

(56) References Cited

OTHER PUBLICATIONS

H. Ding et al., Nonlinear vibration isolation for fluid-conveying pipes using quasi-zero stiffness characteristics, Mech. Syst. Signal Process. 121 (2019) 675-688.

C. Liu et al., A quasi-zero-stiffness device capable of vibration isolation and energy harvesting using piezoelectric buckled beams, Energy 233 (2021) 121146.

X. Huang et al., Vibration isolation characteristics of a nonlinear isolator using Euler buckled beam as negative stiffness corrector: a theoretical and experimental study, J. Sound Vib. 333 (2014) 1132-1148.

Y. Zhang et al., Design and analysis of a vibration isolation system with cam-roller-spring-rod mechanism, J. Vib. Control, (2021) Doi: 10.1177/10775463211000516.

Y. Yao et al., Analytical and experimental investigation of a high-static-low-dynamic stiffness isolator with cam-roller-spring mechanism, Int. J. Mech. Sci. 186 (2020) 105888.

D. Xu et al., Theoretical and experimental analyses of a nonlinear magnetic vibration isolator with quasi-zero-stiffness characteristic, J. Sound Vib. 332 (2013) 3377-3389.

A. Carrella et al., On the design of a high-static-low-dynamic stiffness isolator using linear mechanical springs and magnets, J. Sound Vib. 315 (2008) 712-720.

S. Sadeghi et al., Fluidic origami cellular structure with asymmetric quasi-zero stiffness for low-frequency vibration isolation, Smart Mater. Struct. 28 (2019) 065006.

K. Ye et al., An origami inspired quasi-zero stiffness vibration isolator using a novel truss-spring based stack Miura-ori structure, Mech. Syst. Signal Process. 165 (2022) 108383.

S. Ishida et al., Design and experimental analysis of origami-inspired vibration isolator with quasi-zero-stiffness characteristic, J. Vib. Acoust. 139 (2017) 051004.

K. Inamoto et al., Improved feasible load range and its effect on the frequency response of origami-inspired vibration isolators with quasi-zero-stiffness characteristics, J. Vib. Acoust. 141 (2019) 021004.

A. Carrella et al., Force and displacement transmissibility of a nonlinear isolator with high-static-low-dynamic-stiffness, Int. J. Mech. Sci. 55 (2012) 22-29.

B.A. Fulcher et al., Analytical and experimental investigation of buckled beams as negative stiffness elements for passive vibration and shock isolation systems. J. Vib. Acoust. 136 (2014) 031009.

J. Zhou et al., Nonlinear dynamic characteristics of a quasi-zero stiffness vibration isolator with cam-roller-spring mechanisms, J. Sound Vib. 346 (2015) 53-69.

Z. Zhai et al., In situ stiffness manipulation using elegant curved origami, Sci. Adv. 6 (2020) eabe2000.

B. Yan et al., A bistable vibration isolator with nonlinear electromagnetic shunt damping, Mech. Syst. Signal Process. 136 (2020) 106504.

B. Yan et al., Theoretical modeling and experimental analysis of nonlinear electromagnetic shunt damping, J. Sound Vib. 471 (2020) 115184.

H. Ma et al., Nonlinear damping and mass effects of electromagnetic shunt damping for enhanced nonlinear vibration isolation, Mech. Syst. Signal Process. 146 (2021) 107010.

H. Li et al., Bio-inspired passive base isolator with tuned mass damper inerter for structural control, Smart Mater. Struct. 28 (2019) 105008.

Y. Wang et al., Nonlinear analysis of a bio-inspired vertically asymmetric isolation system under different structural constraints, Nonlinear Dyn. 95 (2019) 445-464.

X. Jing et al., Critical factors in designing a class of X-shaped structures for vibration isolation, Eng. Struct. 199 (2019) 109659.

Z. Wu et al., Vibration isolation by exploring bio-inspired structural nonlinearity, Bioinspirat. Biomimet. 10 (2015) 056015.

J. Bian et al., Superior nonlinear passive damping characteristics of the bio-inspired limb-like or X-shaped structure, Mech. Syst. Signal Process. 125 (2019) 21-51.

X. Feng et al., Bio-inspired anti-vibration with nonlinear inertia coupling, Mech. Syst. Signal Process. 124 (2019) 562-595.

G. Jiang et al., A novel bio-inspired multi-joint anti-vibration structure and its nonlinear HSLDS properties, Mech. Syst. Signal Process. 138 (2020) 106552.

H. Dai et al., Post-capture vibration suppression of spacecraft via a bio-inspired isolation system, Mech. Syst. Signal Process. 105 (2018) 214-240.

T. Deng et al., A bio-inspired isolator based on characteristics of quasi-zero stiffness and bird multi-layer neck, Mech. Syst. Signal Process. 145 (2020) 106967.

R.G. Cobb et al., Vibration isolation and suppression system for precision payloads in space, Smart Mater. Struct. 8 (1999) 798-812.

D. Thayer et al., Six-axis vibration isolation system using soft actuators and multiple sensors, J. Spacecraft Rockets. 39 (2002) 206-212.

D. Kamesh et al., Modeling, design and analysis of low frequency platform for attenuating micro-vibration in spacecraft, J. Sound Vib. 329 (2010) 3431-3450.

Y. Wang et al., Six degree-of-freedom microvibration hybrid control system for high technology facilities, Int. J. Struct. Stab. Dyn. 9 (2009) 437-460.

M.E. Hoque et al., A six-axis hybrid vibration isolation system using active zero-power control supported by passive weight support mechanism, J. Sound Vib. 329 (2010) 3417-3430.

K. Ye et al., A novel integrated quasi-zero stiffness vibration isolator for coupled translational and rotational vibrations, Mech. Syst. Signal Process. 149 (2021) 107340.

J. Zhou et al., A six degrees-of-freedom vibration isolation platform supported by a hexapod of quasi-zero-stiffness struts, J. Vib. Acoust. 139 (2017) 034502.

G. Dong et al., Analytical study of the low frequency multi-direction isolator with high-static-low- dynamic stiffness struts and spatial pendulum, Mech. Syst. Signal Process. 110 (2018) 521-539.

X. Sun et al., Multi-direction vibration isolation with quasi-zero stiffness by employing geometrical nonlinearity, Mech. Syst. Signal Process. 62 (2015) 149-163.

Z. Wu et al., A 6DOF passive vibration isolator using X-shape supporting structures, J. Sound Vib. 380 (2016) 90-111.

J. Tang et al., A 6-DOF micro-vibration isolation platform based on the quasi-zero-stiffness isolator. Proc. IMechE, Part C: J Mechanical Engineering Science. (2021) Doi: 10.1177/095.

* cited by examiner

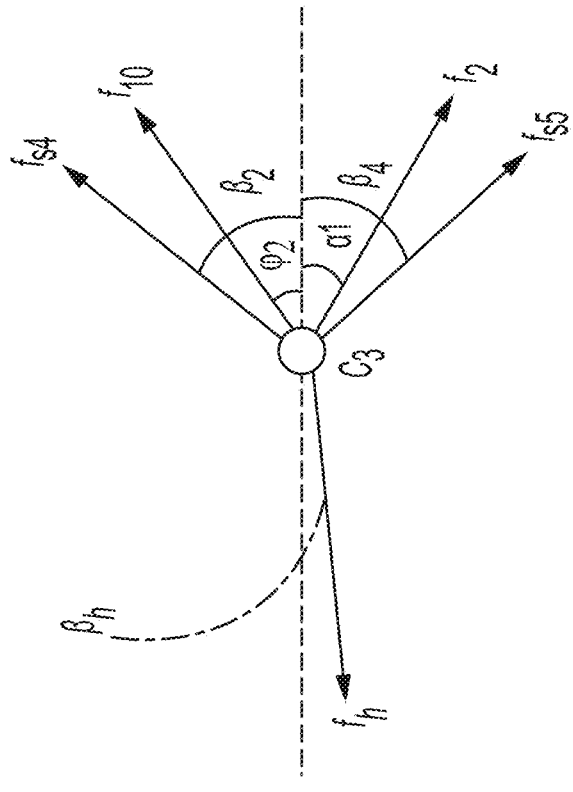
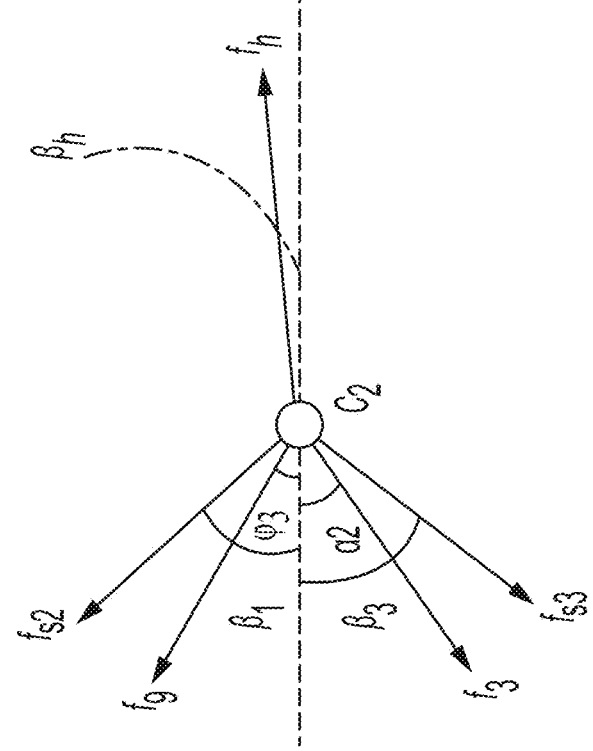
FIG. 5C

| | $x$ direction | $z$ direction | $\psi$ direction |
|---|---|---|---|
| $y$ | $x_e$ | $z_e$ | $\psi_e$ |
| $y_b$ | $x_b$ | $z_b$ | $\psi_b$ |
| $y_0$ | $\dfrac{c_{1x} + c_{2x}\eta_{x0}}{M}$ | $\dfrac{c_{1z} + c_{2z}\eta_{z0}}{M}$ | $\dfrac{c_{1\psi} + c_{2\psi}\eta_{\psi0}}{J}$ |
| $y_1$ | $\dfrac{c_{2x}\eta_{x1}}{M}$ | $\dfrac{c_{2z}\eta_{z1}}{M}$ | $\dfrac{c_{2\psi}\eta_{\psi1}}{J}$ |
| $y_2$ | $\dfrac{c_{2x}\eta_{x2}}{M}$ | $\dfrac{c_{2z}\eta_{z2}}{M}$ | $\dfrac{c_{2\psi}\eta_{\psi2}}{J}$ |
| $y_3$ | $\dfrac{c_{2x}\eta_{x3}}{M}$ | $\dfrac{c_{2z}\eta_{z3}}{M}$ | $\dfrac{c_{2\psi}\eta_{\psi3}}{J}$ |
| $y_4$ | $\dfrac{c_{2x}\eta_{x4}}{M}$ | $\dfrac{c_{2z}\eta_{z4}}{M}$ | $\dfrac{c_{2\psi}\eta_{\psi4}}{J}$ |
| $\lambda_1$ | $\dfrac{\xi_{x1}}{M}$ | $\dfrac{\xi_{z1}}{M}$ | $\dfrac{\xi_{\psi1}}{J}$ |
| $\lambda_2$ | $\dfrac{\xi_{x2}}{M}$ | $\dfrac{\xi_{z2}}{M}$ | $\dfrac{\xi_{\psi2}}{J}$ |
| $\lambda_3$ | $\dfrac{\xi_{x3}}{M}$ | $\dfrac{\xi_{z3}}{M}$ | $\dfrac{\xi_{\psi3}}{J}$ |
| $\lambda_4$ | $\dfrac{\xi_{x4}}{M}$ | $\dfrac{\xi_{z4}}{M}$ | $\dfrac{\xi_{\psi4}}{J}$ |

FIG. 10

MULTI-DEGREE ANTI-VIBRATION UNIT

TECHNICAL FIELD

The present application relates generally to anti-vibration structures. More specifically, the present application relates to quasi-zero stiffness (QZS) anti-vibration devices.

BACKGROUND

Vibration problems are often considered a negative factor in many engineering systems. Detrimental vibrations may significantly affect the accuracy of precision equipment, reduce service life of instruments, and cause structural fatigue damage. As such, the unwanted vibrations need to be controlled within a rational and acceptable range in engineering systems. Various vibration suppression systems attempt to address this issue, such as traditional linear passive vibration isolators, active/semi-active isolation elements, and nonlinear quasi-zero stiffness (QZS) passive isolators, though each have their own drawbacks.

Traditional linear vibration isolators can only suppress structural vibration with excitation frequency larger than $\sqrt{2}$ times of the natural frequency, which makes it difficult to achieve low-frequency vibration isolation. Active or semi-active isolation elements often need additional active actuators and controllers, causing considerable energy inputs and increasing the complexity of vibration isolation systems. Many typical nonlinear QZS passive isolators are designed to attenuate the transmission of a single vertical vibration. With performance improvement in high precision manufacturing and measuring equipment, however, external excitations often distribute in more than a single direction, and therefore multi-direction low-frequency isolation with high efficiency is needed for attenuating transmission of multi-direction vibrations. Additionally, There remains room for improvement with respect to typical nonlinear QZS passive isolators having multiple degrees of freedom.

SUMMARY

The present disclosure provides new and innovative anti-vibration units for vibration suppression in multiple directions. The provided anti-vibration units may include a passive X-shaped mechanism for vibration suppression. The included passive X-shaped mechanism may have less bars than typical anti-vibration units having an X-shaped mechanism and can therefore be more compact than such typical anti-vibration units. At least some aspects of the anti-vibration units do not include a guiding slider for motion restriction, which helps reduce friction generated by motion of such aspects of the anti-vibration units. At least some of the anti-vibration units disclosed herein may include a new and innovative component arrangement. This component arrangement may enable more flexible usage of the X-shaped mechanism for vibration suppression than typical anti-vibration units including an X-shaped mechanism. For instance, combining two or more of the provided anti-vibration units, and/or restricting the motion of the vibration suppression mechanism in one or more directions, can achieve various degrees-of-freedom of vibration isolation (e.g., 1, 2, 3, 4, 5, or 6 degrees-of-freedom).

In an example, an anti-vibration unit includes a base member, a first support member, and a second support member. The first support member includes a first segment at an angle to a second segment, and the first support member is rotatable about a first axis. The second support member includes a third segment at an angle to a fourth segment, and the second support member is rotatable about a second axis. The example anti-vibration unit further includes a first resilient member connecting the first segment of the first support member to the base member, and a second resilient member connecting the third segment of the second support member to the base member.

In another example, an anti-vibration unit includes a first support member and a second support member rotatably connected to the first support member at a first joint. The example anti-vibration unit further includes a first resilient member, a second resilient member, and a third resilient member. Each of the first, second, and third resilient members is rotatable about a first axis that extends through the first joint.

In another example, an anti-vibration unit includes a first base member and a first X-shaped support structure connected to the first base member at first and second rotation joints. The example anti-vibration unit further includes a first support member connected to the first base member at the first rotation joint and a second support member connected to the first base member at the second rotation joint. The first support member has a first segment at an angle to a second segment, and the second support member has a first segment at an angle to a second segment.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIGS. 5A to 5C illustrate schematic force diagrams of select components of the anti-vibration unit of FIG. 1, according to an aspect of the present disclosure.

FIG. 10 is a table of detailed expressions of parameters of an example anti-vibration unit, according to an aspect of the present disclosure.

DETAILED DESCRIPTION

Figure 1:
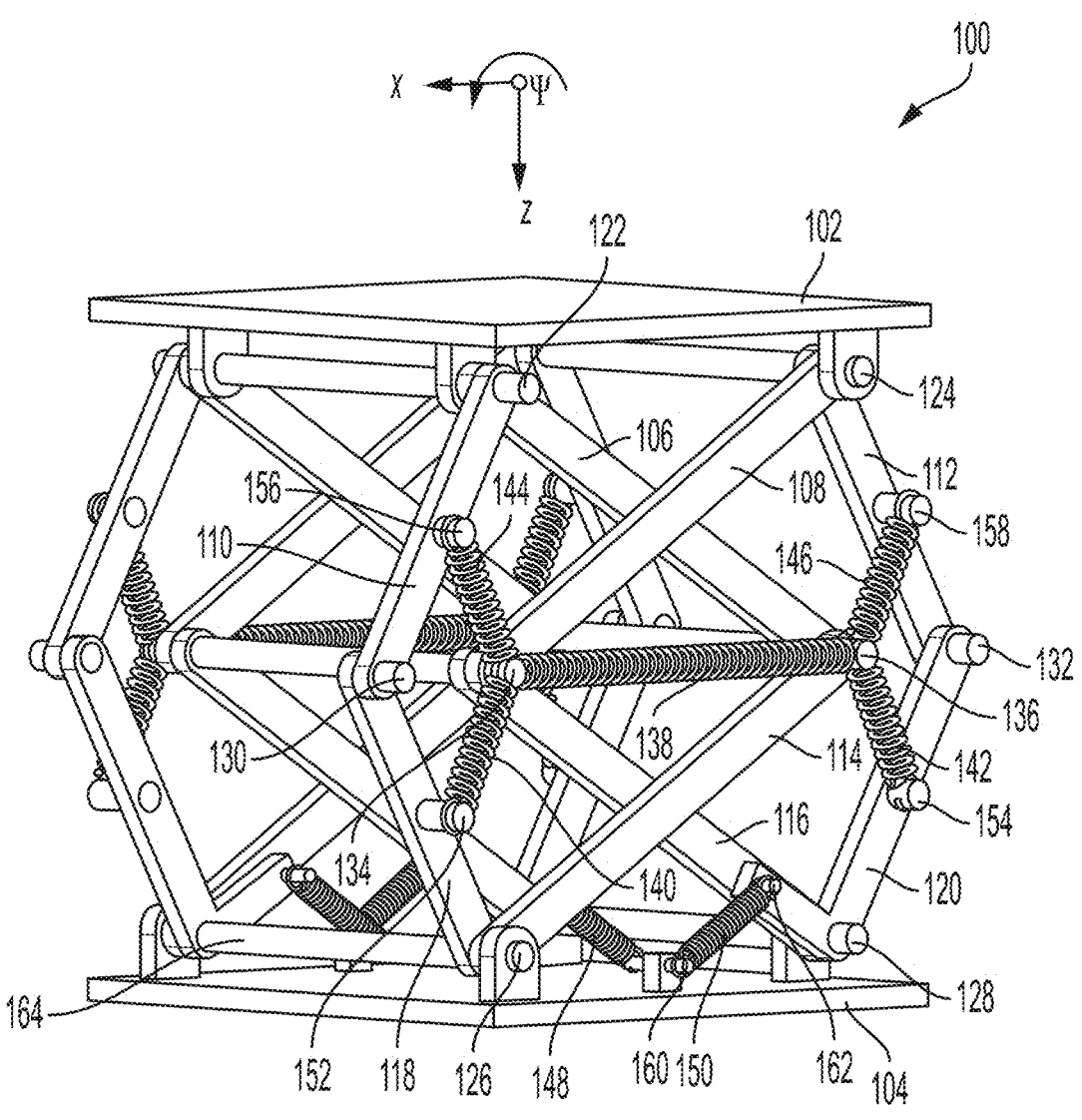
FIG. 1 illustrates a perspective view of an anti-vibration unit, according to an aspect of the present disclosure.

New and innovative anti-vibration units are provided for vibration suppression in multiple directions. The anti-vibration units may have an X-shaped structure as part of its support structure. For instance, an embodiment of the anti-vibration units unit may include two support members (e.g., rods) that cross over one another to form a first X-shape and two other support members that cross over one another to form a second X-shape. The support members of the first X-shape may be rotatably connected to the support members of the second X-shape. It has been shown that X-shaped structures provide beneficial nonlinear effects brought by nonlinear inertia, nonlinear damping, and nonlinear stiffness. The arrangement of the X-shaped structure(s) in embodiments of the anti-vibration unit enables obtaining multi-direction vibration isolation and tunable nonlinear properties, but without losing the advantageous nonlinear properties of the X-shaped structure(s).

The anti-vibration units may include a plurality of resilient members (e.g., springs). The resilient members may be arranged with respect to the support members (e.g., rods) of the anti-vibration units in a new and innovative arrangement that results in a more compact design than typical anti-vibration systems while still providing high performance multi-direction passive vibration control. The arrangement may, additionally or alternatively, enable the anti-vibration unit to not include a guiding slider for motion restriction, which helps reduce friction generated by motion of the anti-vibration unit.

The anti-vibration units can work for ultra-low frequency vibration isolation in three directions in a passive manner. The anti-vibration units can achieve a flexible nonlinear stiffness, which contains zero or quasi-zero stiffness, negative stiffness and positive stiffness. A smooth multi-equilibria state is also achievable. Compared with traditional spring-mass-damper (SMD) and typical QZS systems, the provided anti-vibration units can have an enhanced QZS range of larger stroke with guaranteed loading capacity, and can also achieve a lower resonant frequency with a lower resonant peak. The QZS characteristics of the anti-vibration units with high loading capacity and large stroke can be achieved, not only in the vertical direction, but also in the horizontal and rotational directions, with a guaranteed stable equilibrium due to the flexibility of the anti-vibration units' design.

Embodiments of the anti-vibration unit may be used in a variety of applications, such as remote sensing satellites, aviation seat frames, medical or cargo transportation, suspension systems of the vehicle, etc. For example, remote sensing satellites require highly quiet environments to protect sensitive payloads including astronomical telescopes, laser communication equipment, and micro-gravity experimental devices. In the design of satellite control systems, one of the most important factors is the vibration isolation between the precision payload and the disturbance base, in which a wider isolation frequency range including low frequency and high frequency with high effectiveness is desired to reduce vibration transmission from multiple vibration environments such as noise, solar radiation pressure and aerodynamic disturbance. In another example, a wider frequency range of vibration isolation with high effectiveness is desired in high precision manufacturing devices to reduce the displacement transmission from the multiple different vibration environments such as noise and foundation vibration. Most typical vibration control systems are too complicated to switch from different stiffness modes or require high power cost, which reduces their reliability and restricts their applications on unmanned satellites and high precision manufacturing devices. Embodiments of the provided anti-vibration unit, however, enable tuning the unit's stiffness to control vibration transmissibility and achieve ultra-low frequency vibration isolation in several directions such that it may be used between the precision payload and the disturbance base in satellites and with high precision manufacturing devices.

In another example, heavy-duty commercial vehicles, or medical transport vehicles, and their cargo are usually subjected to mechanical vibrations and shocks from the ground. The vibration transmitted from different directions and different ranges may cause damage to the cargo (e.g., fragile ceramics, high-precision instruments, premature or sick infants). Additionally, most commercial vehicle drivers are prone to long-term exposure to low-frequency vibrations (e.g., from 1 Hz to 20 Hz) caused by road surface excitations, which can result in diseases of muscles, digestive systems and even visual systems. Embodiments of the anti-vibration unit may be structured to provide vibration isolation for either of these applications.

In any of the embodiments of the anti-vibration unit, the various parameters of the anti-vibration unit (e.g., rod segment lengths, spring stiffness, initial assembly angles, spring connection parameters, etc.) can be selected (e.g., tuned) to flexibly meet various requirements of the different applications of the anti-vibration unit. For instance, different applications of the anti-vibration unit can have their own specific requirements, such as a working displacement range, a height of the vibration isolation unit, and/or a payload and frequency range of external excitation. In an example, initial assembly angles can be selected, and then by combining the selected initial assembly angles with a desired height of the working environment of the anti-vibration unit, the rod segment lengths can be determined. In another example, the stiffness parameters of the springs in the anti-vibration unit can be determined by adjusting the spring stiffness until the anti-vibration unit satisfies the requirements of the desired payload and working displacement range. In another example still, the rod segment lengths and spring connection parameters can be adjusted to obtain a desired loading capacity and QZS zone requirements.

Joints that facilitate rotation of two connected components with respect to one another are described herein. Any suitable joint that connects two components and enables such movement may be used. For example, a bar positioned through respective openings in each of the two components is one such suitable joint.

As used herein, a resilient member is an elastic component that repeatedly stores and releases mechanical energy. For example, a resilient member may be any suitable spring (e.g., coil spring, extension/tension spring, machined spring, etc.).

FIG. 1 illustrates an example anti-vibration unit 100. The anti-vibration unit 100 may include a base member 102 and/or a base member 104. In some aspects, the base member 102 and/or the base member 104 may be a part of, or may be integrated with, an object (e.g., a chair or vehicle). The anti-vibration unit 100 may include an arrangement of multiple support members. For example, a support member 106 may be rotatably connected to the base member 102 at a joint 122. A support member 108 may be rotatably connected to the base member 102 at a joint 124. A support member 114 may be rotatably connected to the base member 104 at a joint 126. A support member 116 may be rotatably connected to the base number 104 at a joint 128. In some aspects, each of the support members 106, 108, 114, and 116 have an equal length. In other aspects, one or more of the support members 106, 108, 114, and 116 may have a different length than the others.

In at least some aspects, the support member 106 may cross over the support member 108 at a crossover point 200 (FIG. 2) to thereby form an X-shape structure. Similarly, the support member 114 may crossover the support member 116 at a crossover point 202 (FIG. 2) to thereby form an X-shape structure. In such aspects, the support member 114 may be rotatably connected to the support member 106 at a joint 136 and/or the support member 116 may be rotatably connected to the support member 108 at a joint 134.

Figure 3:
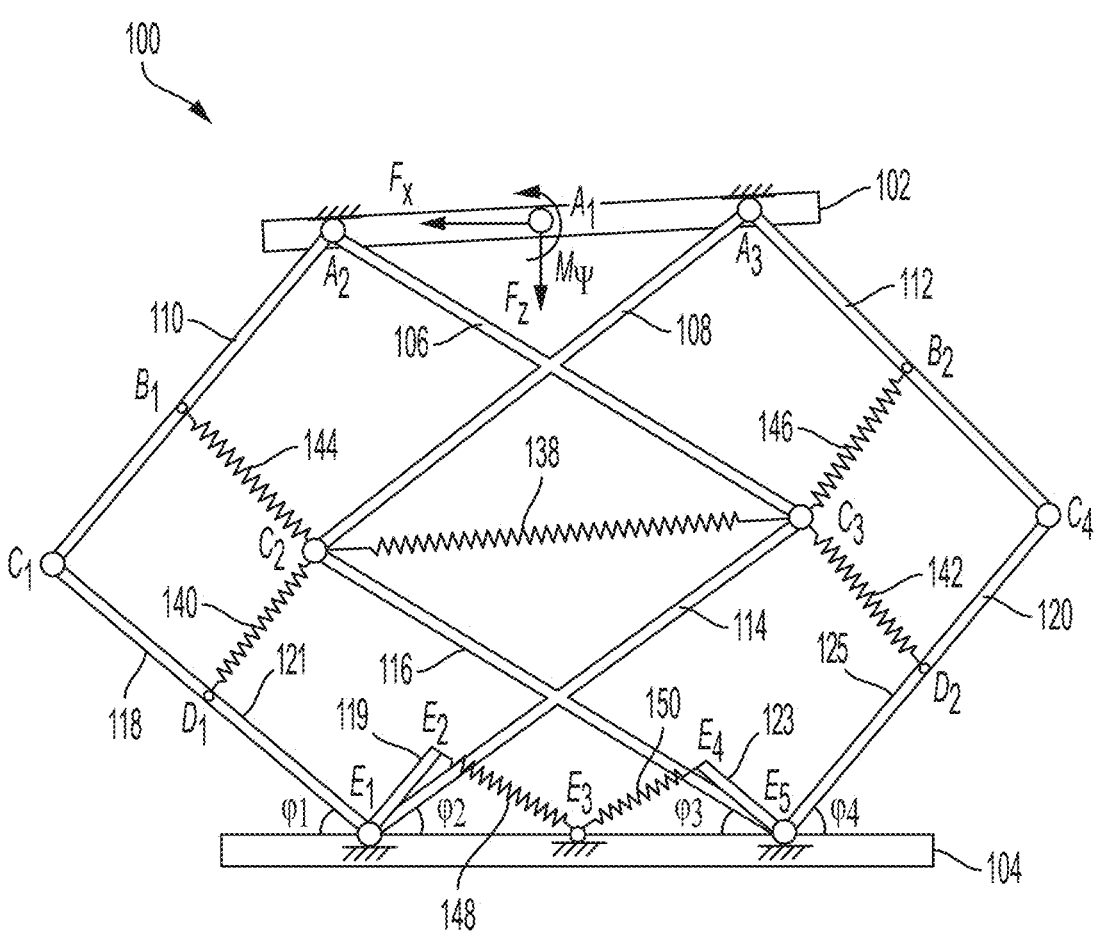
FIG. 3 illustrates a schematic representation of the anti-vibration unit of FIG. 1 after a force is applied, according to an aspect of the present disclosure.
Figures 4A, 4B:
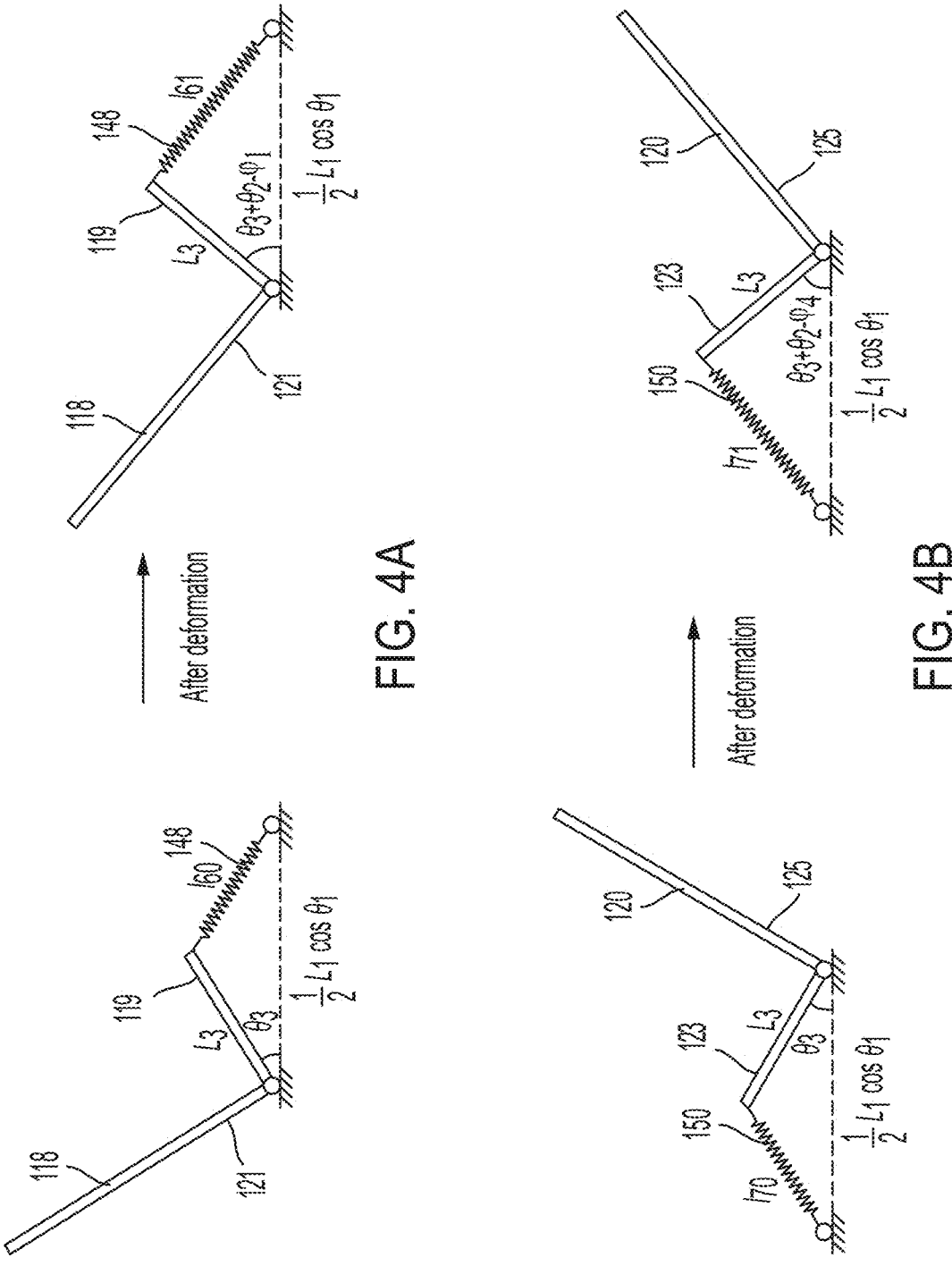
FIGS. 4A and 4B illustrate schematic representations of select components of the anti-vibration unit of FIG. 1 before and after deformation, according to an aspect of the present disclosure.

The anti-vibration unit 100 may include a support member 120. As shown in FIGS. 1, 3 and 4A, the support member 120 may include a first segment 123 at an angle to a second segment 125. For example, the first segment 123 may be at a 90° angle to the second segment 125 such that the support member 120 has an L-shape, though other suitable angles are contemplated. In at least some aspects, the second segment 125 of the support member 120 has a greater length than the first segment 123, though other suitable length distributions are contemplated. The support member 120 may be a single piece of material such that its first and second segments 123, 125 are integral with one another. Alternatively, the first and second segments 123, 125 of the support member 120 may be separate pieces that are attached to one another. The support member 120 may be connected to the base member 104 at the joint 128. As shown in FIG. 1, the joint 128 may be positioned where the first segment 119 of the support member 120 meets the second segment 121.

The anti-vibration unit 100 may include a support member 118. While hidden in FIG. 1, as shown in FIGS. 3 and 4B, the support member 118 may include a first segment 119 at an angle to a second segment 121 in a similar manner as the support member 120. For example, the first segment 119 of the support member 118 may be at a 90° angle to its second segment 121 such that the support member 118 has an L-shape, though other suitable angles are contemplated. In at least some aspects, the second segment 121 of the support member 118 has a greater length than the first segment 119, though other suitable length distributions are contemplated. The support member 118 may be a single piece of material such that its first and second segments 119, 121 are integral with one another. Alternatively, the first and second segments 119, 121 of the support member 118 may be separate pieces that are attached to one another. The support member 118 may be connected to the base member 104 at the joint 126. As shown in FIG. 1, the joint 126 may be positioned where the first segment 119 of the support member 118 meets the second segment 121.

In at least some aspects, a support member 110 may be rotatably connected to the base member 102 at the joint 122. The support member 110 may be rotatably connected to the support member 118 at a joint 130. In at least some aspects, a support member 112 may be rotatably connected to the base member 102 at the joint 124. The support member 112 may be rotatably connected to the support member 120 at a joint 132.

The anti-vibration unit 100 may include an arrangement of multiple resilient members (e.g., springs). For example, a resilient member 138 may extend between the joint 134 and the joint 136. One end of the resilient member 138 may be rotatably connected at the joint 134 while its other end may be rotatably connected at the joint 136. The resilient member 138 can help provide main stiffness of the anti-vibration unit 100. A resilient member 140 may extend between the joint 134 and a joint 152 located on the support member 118. One end of the resilient member 140 may be rotatably connected at the joint 134 while its other end may be rotatably connected at the joint 152. In some examples, such as the illustrated one, the joint 152 may be located at the midpoint along the length of the support member 118. Stated differently, the joint 152 may be equidistant between the joint 126 and the joint 130.

A resilient member 142 may extend between the joint 136 and a joint 154 located on the support member 120. One end of the resilient member 142 may be rotatably connected at the joint 136 while its other end may be rotatably connected at the joint 154. In some examples, such as the illustrated one, the joint 154 may be located at the midpoint along the length of the support member 120. Stated differently, the joint 154 may be equidistant between the joint 128 and the joint 132.

A resilient member 144 may extend between the joint 134 and a joint 156 located on the support member 110. One end of the resilient member 144 may be rotatably connected at the joint 134 while its other end may be rotatably connected at the joint 156. In some examples, such as the illustrated one, the joint 156 may be located at the midpoint along the length of the support member 110. Stated differently, the joint 156 may be equidistant between the joint 122 and the joint 130.

A resilient member 146 may extend between the joint 136 and a joint 158 located on the support member 112. One end of the resilient member 146 may be rotatably connected at the joint 136 while its other end may be rotatably connected at the joint 158. In some examples, such as the illustrated one, the joint 158 may be located at the midpoint along the length of the support member 112. Stated differently, the joint 158 may be equidistant between the joint 124 and the joint 132. The resilient members 140, 142, 144, and 146 can help prevent the anti-vibration unit 100 from overturning.

A resilient member 150 may extend between the support member 120 and the base member 104. For example, one end of the resilient member 150 may be rotatably connected to the base member 104 at a joint 160 while the other end of the resilient member 150 may be rotatably connected to the support member 120 at a joint 162. A resilient member 148 may extend between the support member 118 and the base member 104. For example, while hidden from view in FIG. 1, one end of the resilient member 148 may be rotatably connected to the base member 104 at a joint in a similar manner as described above for the resilient member 150 and the base member 104. The other end of the resilient member 148 may be rotatably connected to the support member 118 at a joint in a similar manner as described above for the resilient member 150 and the support member 120. The resilient members 148 and 150 can help provide both rotational and vertical translational-motion stiffness in order to help improve the stiffness and loading capacity of the anti-vibration unit 100.

In at least some examples, each of the support members 106, 108, 110, 112, 114, 116, 118, and 120 has a suitable stiffness to withstand the forces exerted on the anti-vibration unit 100 as well as by each of the resilient members 138, 140, 142, 144, 146, 148, and 150. For example, each may be a rod having any suitable cross-section (e.g., circular, rectangular, etc.).

While only one side of the anti-vibration unit 100 is described in the preceding description, it will be appreciated that the opposing side of the anti-vibration unit 100 may be a mirror image of the described side. In at least some aspects, one or more support bars may extend between the sides to provide stability and/or support to the anti-vibration unit 100. For example, a support bar 164 may extend from the joint 126. Support bars similar to the support bar 164 may extend from one or more of the joints 122, 124, 128, 130, 132, 134, and 136.

In various aspects, the anti-vibration unit 100 may have three degrees-of-freedom. For example, the three axes (e.g., horizontal, vertical, and rotational) on which the anti-vibration unit 100 may move in such aspects are shown in FIG. 1. In some aspects, the anti-vibration unit 100 may have two degrees-of-freedom. For example, if one of the movement of the horizontal or the rotational direction is restricted, an anti-vibration unit 100 having two degrees-of-freedom can be achieved. In some aspects, the anti-vibration unit 100 may have one degree-of-freedom. For example, if both of the movement of the horizontal and the rotational direction is restricted, an anti-vibration unit 100 having one degree-of-freedom can be achieved. In various aspects, two or more anti-vibration units 100 may be combined to achieve an anti-vibration system having more than three degrees-of-freedom (e.g., four, five, or six degrees-of-freedom). For instance, one or both of the combined anti-vibration units 100 may be restricted as described above to achieve four or five degrees-of-freedom, or neither may be restricted to achieve six degrees-of-freedom.

The following description provides a mechanical model and equations of motion of an example anti-vibration unit 100 as well as various parameter and performance analyses. In the following, each of the resilient members 138, 140, 142, 144, 146, 148, and 150 is referred to as a spring. Specifically, the resilient member 138 is referred to as spring "1", the resilient member 144 as spring "2", the resilient member 140 as spring "3", the resilient member 146 as spring "4", and the resilient member 142 as spring "5", the resilient member 148 as spring "6", and the resilient member 150 as spring "7". As described above, however, each of the resilient members 138, 140, 142, 144, 146, 148, and 150 may be a suitable resilient component other than a spring. Additionally, each of the support members 106, 108, 110, 112, 114, 116, 118, and 120 may be referred to as a rod in the following exemplary description. Specifically, the support member 106 may be referred to as rod $A_2C_3$, the support member 108 may be referred to as rod $A_3C_2$, the support member 110 may be referred to as rod $A_2C_1$, the support member 112 may be referred to as rod $A_3C_4$, the support member 114 may be referred to as rod $C_3E_1$, the support member 116 may be referred to as rod $C_2E_5$, the support member 118 may be referred to as rod $C_1E_1E_2$, and the support member 120 may be referred to as rod $C_4E_5E_4$. Each of the joints 122, 124, 126, 128, 130, 132, 134, and 136 may be referred to as a coordinate (e.g., $A_2$, $C_2$, etc.).

Figure 2:
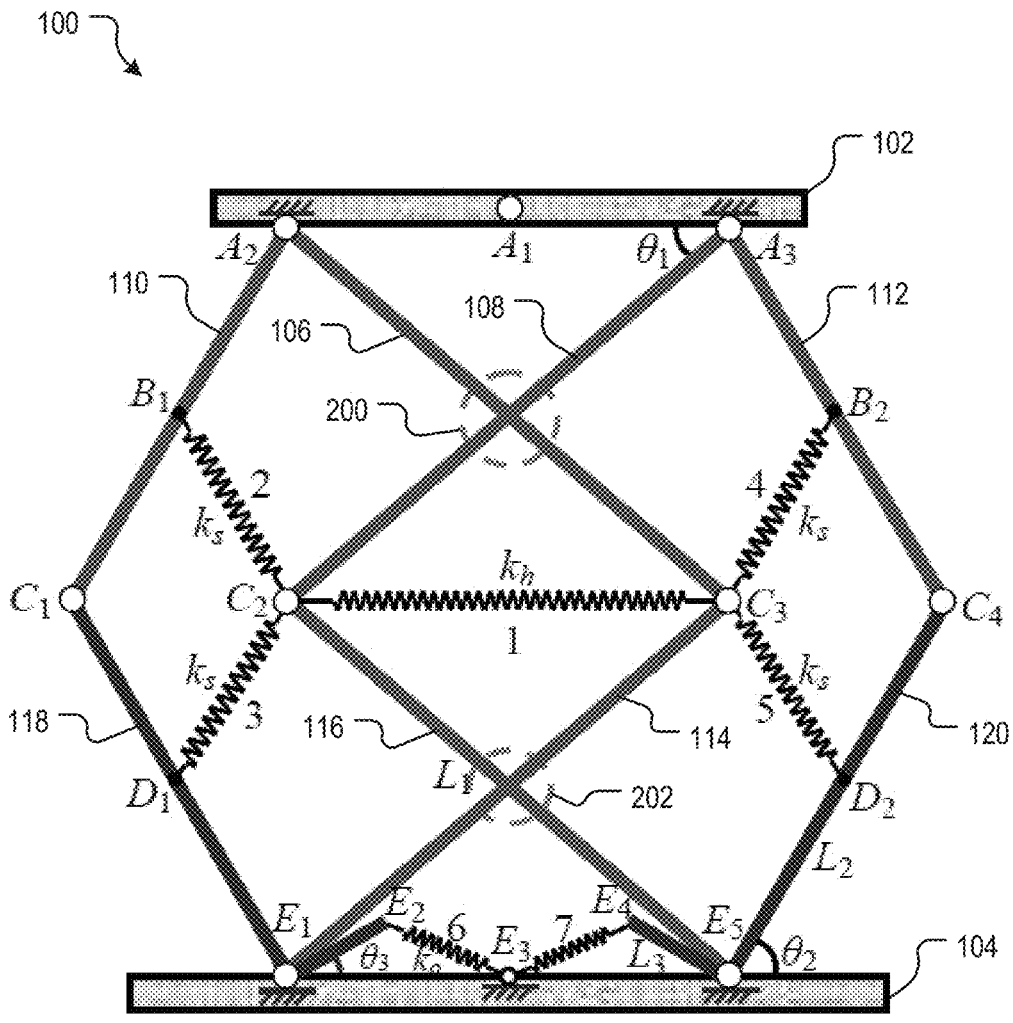
FIG. 2 illustrates a schematic representation of the anti-vibration unit of FIG. 1, according to an aspect of the present disclosure.

FIG. 2 illustrates a schematic diagram of the example anti-vibration unit 100. The length of the support members 106, 108, 114, and 116 in the middle of the anti-vibration unit 100 is $L_1$, and the corresponding initial angle is represented by $\theta_1$. The length and the initial angle of the support members 110, 112, 118, and 120 are denoted by $L_2$ and $\theta_2$. The crossover points 200 and 202 are at the midpoints of the support members 106, 108, 114, and 116. In this example, the points $C_1$, $C_2$, $C_3$ and $C_4$ are at the same horizontal position, that is, $L_1 \sin \theta_1 = L_2 \sin \theta_2$. The points $A_2$, $C_2$ and $E_1$, and the points $A_3$, $C_3$ and $E_5$ are co-linear in the vertical direction. The linear spring "1" with stiffness $k_h$ in the horizontal direction is installed between points $C_2$ and $C_3$ and can help provide main stiffness of the anti-vibration unit 100. Additionally, four linear springs "2", "3", "4" and "5" with stiffness $k_s$ are connected at the midpoints $B_1$, $B_2$, $D_1$ and $D_2$ of the outer support rods and can help prevent the anti-vibration unit 100 from overturning. The rod materials can be any suitable lightweight but stiff ones, and compared with the deformation of springs, the elastic deflections of the rods are all small and can be ignored. The support members

118 and 120 can include oblique segments with length $L_3$ rigidly connected to, or integral with, the segments with length $L_2$ and are designed with two springs with stiffness $k_0$, which can help provide both rotational and vertical translational-motion stiffness in order to help improve the stiffness and loading capacity of the anti-vibration unit 100. The initial angle between the oblique rods and the horizontal direction is denoted by $\theta_3$.

FIG. 3 illustrates a schematic of the anti-vibration unit 100 after the schematic shown in FIG. 2 is deformed under horizontal force $F_x$, vertical force $F_z$ and bending moment $M_\psi$. The origin of the coordinates is located at point $A_1$. The motion of the anti-vibration unit 100 can be simplified as the horizontal and vertical translations and the in-plane rotation of point $A_1$. Before movement, the corresponding coordinates of points $A_1$, $A_2$ and $A_3$ in the top layer and the points $C_1$, $C_2$, $C_3$ and $C_4$ in the middle of the anti-vibration unit 100 along the x and z directions can be expressed as $$A_1 = \{0, 0\}, A_2 = \left\{\frac{1}{2}L_1\cos\theta_1, 0\right\}, A_3 = \left\{-\frac{1}{2}L_1\cos\theta_1, 0\right\}, \tag{1}$$

$$C_1 = \left\{\frac{1}{2}L_1\cos\theta_1 + L_2\cos\theta_2, L_2\sin\theta_2\right\}, \tag{2}$$

$$C_2 = \left\{\frac{1}{2}L_1\cos\theta_1, L_1\sin\theta_1\right\},$$

$$C_3 = \left\{-\frac{1}{2}L_1\cos\theta_1, L_1\sin\theta_1\right\}, \tag{3}$$

$$C_4 = \left\{-\frac{1}{2}L_1\cos\theta_1 - L_2\cos\theta_2, L_2\sin\theta_2\right\}.$$

Similarly, the corresponding coordinates of the midpoints $B_1$, $B_2$, $D_1$ and $D_2$ in the outer four support rods and the points $E_1$, $E_2$, $E_3$, $E_4$ and $E_5$ in the bottom layer of the anti-vibration unit 100 before mechanism movement can be expressed by $$B_1 = \left\{\frac{1}{2}(L_1\cos\theta_1 + L_2\cos\theta_2), \frac{1}{2}L_2\sin\theta_2\right\}, \tag{4}$$

$$B_2 = \left\{-\frac{1}{2}(L_1\cos\theta_1 + L_2\cos\theta_2), \frac{1}{2}L_2\sin\theta_2\right\},$$

$$D_1 = \left\{\frac{1}{2}(L_1\cos\theta_1 + L_2\cos\theta_2), \frac{3}{2}L_2\sin\theta_2\right\}, \tag{5}$$

$$D_2 = \left\{-\frac{1}{2}(L_1\cos\theta_1 + L_2\cos\theta_2), \frac{3}{2}L_2\sin\theta_2\right\},$$

$$E_1 = \left\{\frac{1}{2}L_1\cos\theta_1, 2L_1\sin\theta_1\right\}, \tag{6}$$

$$E_2 = \left\{\frac{1}{2}L_1\cos\theta_1 - L_3\cos\theta_3, 2L_1\sin\theta_1 - L_3\sin\theta_3\right\},$$

$$E_3 = \{0, 2L_1\sin\theta_1\}, \tag{7}$$

$$E_4 = \left\{-\frac{1}{2}L_1\cos\theta_1 + L_3\cos\theta_3, 2L_1\sin\theta_1 - L_3\sin\theta_3\right\},$$

$$E_5 = \left\{-\frac{1}{2}L_1\cos\theta_1, 2L_1\sin\theta_1\right\}.$$

After the movement of the anti-vibration unit 100, it can be assumed that the coordinate of point $A_1$ is (x, z), and the in-plane rotation angle of point $A_1$ can be represented by $\psi$. Then, the coordinates of points $A_2$ and $A_3$ can be written as $$A_2 = \left\{x + \frac{1}{2}L_1\cos\theta_1\cos\psi, z + \frac{1}{2}L_1\cos\theta_1\sin\psi\right\}, \tag{8}$$

-continued $$A_3 = \left\{x - \frac{1}{2}L_1\cos\theta_1\cos\psi, z - \frac{1}{2}L_1\cos\theta_1\sin\psi\right\}.$$

For this discussion, it can be assumed that the angles between the rods $C_1E_1$, $C_3E_1$, $C_2E_5$, $C_4E_5$ and the horizontal direction are $\varphi_1$, $\varphi_2$, $\varphi_3$ and $\varphi_4$. Based on the geometrical relationship, the corresponding coordinates of the points $C_1$, $C_2$, $C_3$ and $C_4$ in the middle of the anti-vibration unit 100 after movement can be expressed as $$C_1 = \left\{\frac{1}{2}L_1\cos\theta_1 + L_2\cos\varphi_1, 2L_2\sin\theta_2 - L_2\sin\varphi_1\right\}, \tag{9}$$

$$C_2 = \left\{-\frac{1}{2}L_1\cos\theta_1 + L_1\cos\varphi_3, 2L_1\sin\theta_1 - L_1\sin\varphi_3\right\},$$

$$C_3 = \left\{\frac{1}{2}L_1\cos\theta_1 - L_1\cos\varphi_2, 2L_1\sin\theta_1 - L_1\sin\varphi_2\right\}, \tag{10}$$

$$C_4 = \left\{-\frac{1}{2}L_1\cos\theta_1 - L_2\cos\varphi_4, 2L_2\sin\theta_2 - L_2\sin\varphi_4\right\}.$$

The lengths of the rods $A_2C_1$ and $A_3C_4$ are $L_2$, and the lengths of the rods $A_2C_3$ and $A_3C_2$ are equal to $L_1$. Therefore, the length of the rods can be expressed by the coordinates of the points $A_2$, $A_3$, $C_1$, $C_2$, $C_3$ and $C_4$ after mechanism movement as follows:

$$\left(\frac{1}{2}L_1\cos\theta_1 + L_2\cos\varphi_1 - x - \frac{1}{2}L_1\cos\theta_1\cos\psi\right)^2 + \tag{11}$$

$$\left(2L_2\sin\theta_2 - L_2\sin\varphi_1 - z - \frac{1}{2}L_1\cos\theta_1\sin\psi\right)^2 = L_2^2,$$

$$\left(x - \frac{1}{2}L_1\cos\theta_1\cos\psi + \frac{1}{2}L_1\cos\theta_1 + L_2\cos\varphi_4\right)^2 + \tag{12}$$

$$\left(z - \frac{1}{2}L_1\cos\theta_1\sin\psi - 2L_2\sin\theta_2 + L_2\sin\varphi_4\right)^2 = L_2^2,$$

$$\left(x + \frac{1}{2}L_1\cos\theta_1\cos\psi - \frac{1}{2}L_1\cos\theta_1 + L_1\cos\theta_1 + L_1\cos\varphi_2\right)^2 + \tag{13}$$

$$\left(z + \frac{1}{2}L_1\cos\theta_1\sin\psi - 2L_1\sin\theta_1 + L_1\sin\varphi_2\right)^2 = L_1^2,$$

$$\left(x - \frac{1}{2}L_1\cos\theta_1\cos\psi + \frac{1}{2}L_1\cos\theta_1 - L_1\cos\varphi_3\right)^2 + \tag{14}$$

$$\left(z - \frac{1}{2}L_1\cos\theta_1\sin\psi - 2L_1\sin\theta_1 + L_1\sin\varphi_3\right)^2 = L_1^2.$$

Based on Equations (11)-(14), the angles $\varphi_1$, $\varphi_2$, $\varphi_3$ and $\varphi_4$ between the rods $C_1E_1$, $C_3E_1$, $C_2E_5$, $C_4E_5$ and horizontal direction can be solved, and the corresponding coordinates of the points $C_1$, $C_2$, $C_3$ and $C_4$ in the anti-vibration unit 100 after mechanism movement can be obtained. In addition, the corresponding coordinates of the midpoints $B_1$, $B_2$, $D_1$ and $D_2$ in the outer support rods of the anti-vibration unit 100 after mechanism movement can be obtained as $$B_1 = \left\{\frac{1}{2}x + \frac{1}{4}L_1\cos\theta_1\cos\psi + \frac{1}{4}L_1\cos\theta_1 + \frac{1}{2}L_2\cos\varphi_1, \tag{15}\right.$$

$$\left.\frac{1}{2}z + \frac{1}{4}L_1\cos\theta_1\sin\psi + L_2\sin\theta_2 - \frac{1}{2}L_2\sin\varphi_1\right\},$$

$$B_2 = \left\{\frac{1}{2}x - \frac{1}{4}L_1\cos\theta_1\cos\psi - \frac{1}{4}L_1\cos\theta_1 - \frac{1}{2}L_2\cos\varphi_4, \tag{16}\right.$$

-continued $$\frac{1}{2}z - \frac{1}{4}L_1\cos\theta_1\sin\psi + L_2\sin\theta_2 - \frac{1}{2}L_2\sin\varphi_4 \Big\},$$

$$D_1 = \Big\{ \frac{1}{2}L_1\cos\theta_1 + \frac{1}{2}L_2\cos\varphi_1,\ 2L_2\sin\theta_2 - \frac{1}{2}L_2\sin\varphi_1 \Big\},\qquad (17)$$

$$D_2 = \Big\{ -\frac{1}{2}L_1\cos_1 - \frac{1}{2}L_2\cos\varphi_4,\ 2L_2\sin\theta_2 - \frac{1}{2}L_2\sin\varphi_4 \Big\}.$$

The springs provide stiffness to the anti-vibration unit 100 in different ways, and the deformations of the springs are also different. Therefore, the deformations of the horizontal and oblique springs in the anti-vibration unit 100 are calculated respectively. According to the geometrical relationship, the deformation length $\Delta l_1$ of the horizontal spring "1" in the anti-vibration unit can be expressed by $$\Delta l_1 = \qquad (18)$$
$$\sqrt{(-L_1\cos\theta_1 + L_1\cos\varphi_3 + L_1\cos\varphi_2)^2 + (L_1\sin\varphi_2 - L_1\sin\varphi_3)^2} - L_1\cos\theta_1.$$

Additionally, the deformation lengths $\Delta l_2$, $\Delta l_3$, $\Delta l_4$ and $\Delta l_5$ of the springs "2", "3", "4" and "5" can be expressed as $$\qquad (19)$$

$$\Delta l_2 =$$
$$\sqrt{\left(\frac{x}{2} + \frac{L_1\cos\theta_1\cos\psi}{4} + \frac{3L_1\cos\theta_1}{4} + \frac{L_2\cos\varphi_1}{2} - L_1\cos\varphi_3\right)^2 + \left(\frac{z}{2} + \frac{L_1\cos\theta_1\sin\psi}{4} - L_1\sin\theta_1 - \frac{L_2\sin\varphi_1}{2} + L_1\sin\varphi_3\right)^2} - \frac{1}{2}L_2,$$

$$\qquad (20)$$

$$\Delta l_3 =$$
$$\sqrt{\left(L_1\cos\theta_1 + \frac{L_2\cos\varphi_1}{2} - L_1\cos\varphi_3\right)^2 + \left(L_1\sin\varphi_3 - \frac{L_2\sin\varphi_1}{2}\right)^2} - \frac{1}{2}L_2,$$

$$\qquad (21)$$

$$\Delta l_4 =$$
$$\sqrt{\left(\frac{x}{2} - \frac{L_1\cos\theta_1\cos\psi}{4} - \frac{3L_1\cos\theta_1}{4} - \frac{L_2\cos\varphi_4}{2} + L_1\cos\varphi_2\right)^2 + \left(\frac{z}{2} - \frac{L_1\cos\theta_1\sin\psi}{4} - L_1\sin\theta_1 - \frac{L_2\sin\varphi_4}{2} + L_1\sin\varphi_2\right)^2} - \frac{1}{2}L_2,$$

$$\qquad (22)$$

$$\Delta l_5 =$$
$$\sqrt{\left(-L_1\cos\theta_1 - \frac{L_2\cos\varphi_4}{2} + L_1\cos\varphi_2\right)^2 + \left(L_1\sin\varphi_2 - \frac{L_2\sin\varphi_4}{2}\right)^2} - \frac{1}{2}L_2.$$

FIG. 4 shows schematic diagrams of (a) the oblique spring "6", or the resilient member 148, and (b) the oblique spring "7", or the resilient member 150, each with stiffness $k_o$ before and after their deformations. According to the deformation relationship, the original length $l_{60}$ and the length $l_{61}$ of the oblique spring "6" after deformation can be expressed by $$l_{60} = \sqrt{L_3^2 + \frac{1}{4}L_1^2\cos^2\theta_1 - L_1L_3\cos\theta_1\cos\theta_3},\qquad (23)$$

$$l_{61} = \sqrt{L_3^2 + \frac{1}{4}L_1^2\cos^2\theta_1 - L_1L_3\cos\theta_1\cos(\theta_3 + \theta_2 - \varphi_1)}.$$

Therefore, the deformation length $\Delta l_6$ of the oblique spring "6" can be written as $$\Delta l_6 = \sqrt{L_3^2 + \frac{1}{4}L_1^2\cos^2\theta_1 - L_1L_3\cos\theta_1\cos(\theta_3 + \theta_2 - \varphi_1)} - \sqrt{L_3^2 + \frac{1}{4}L_1^2\cos^2\theta_1 - L_1L_3\cos\theta_1\cos\theta_3}.\qquad (24)$$

Similarly, the original length $l_{70}$ and the length $l_{71}$ of the oblique spring "7" after deformation can be expressed by $$l_{70} = \sqrt{L_3^2 + \frac{1}{4}L_1^2\cos^2\theta_1 - L_1L_3\cos\theta_1\cos\theta_3},\qquad (25)$$

$$l_{71} = \sqrt{L_3^2 + \frac{1}{4}L_1^2\cos^2\theta_1 - L_1L_3\cos\theta_1\cos(\theta_3 + \theta_2 - \varphi_4)}.$$

Therefore, the deformation length $\Delta l_7$ of the oblique spring "7" can be written as $$\Delta l_7 = \sqrt{L_3^2 + \frac{1}{4}L_1^2\cos^2\theta_1 - L_1L_3\cos\theta_1\cos(\theta_3 + \theta_2 - \varphi_4)} - \sqrt{L_3^2 + \frac{1}{4}L_1^2\cos^2\theta_1 - L_1L_3\cos\theta_1\cos\theta_3}.\qquad (26)$$

Figure 5A:
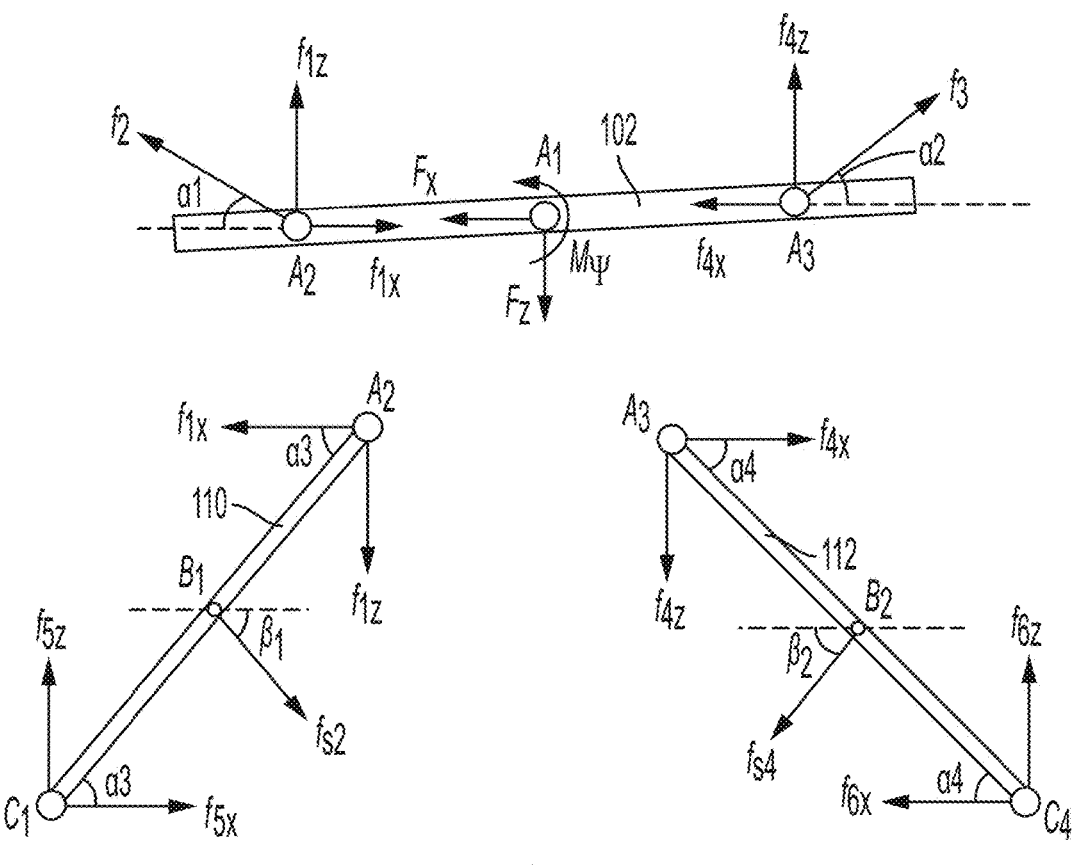
Figure 5B:
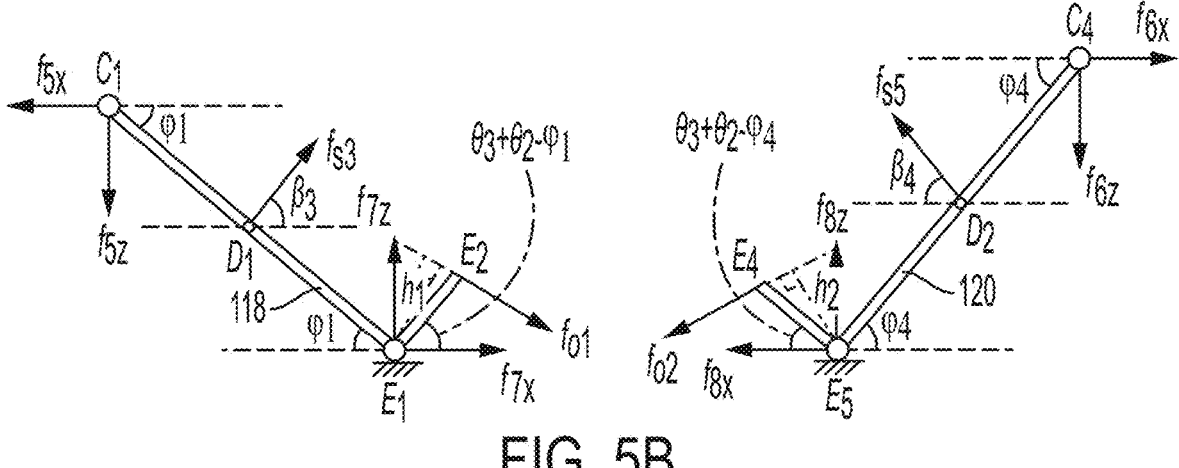

FIG. 5 illustrates force analysis diagrams with loads $F_x$, $F_z$ and $M_\psi$ for (a) the base member 102 and the support members 110 and 112, (b) the support members 118 and 120, and (c) the joints 136 and 136. Based on the static analysis of the top platform, the force and moment equilibrium equations can be written as Equations 27a, 27b, and 27c below where $f_{1x}$ and $f_{1z}$ are the forces produced by rod $A_2C_1$, $f_{4x}$ and $f_{4z}$ are the forces produced by rod $A_3C_4$, $f_2$ and $f_3$ are the internal forces along the rods $A_2C_3$ and $A_3C_2$, and $\alpha_1$ and $\alpha_2$ are the angles between forces $f_2$ and $f_3$ and the horizontal direction. According to the coordinates of the points $A_2$, $A_3$, $C_2$ and $C_3$, the detailed expressions of sine and cosine functions of the angles $\alpha_1$ and $\alpha_2$ can be obtained.

$$F_x + f_2\cos\alpha_1 - f_{1x} + f_{4x} - f_3\cos\alpha_2 = 0,\qquad (27a)$$

$$F_z - f_2\cos\alpha_1 - f_{1z} - f_{4z} - f_3\sin\alpha_2 = 0,\qquad (27b)$$

$$M_\psi + \frac{1}{2}L_1\cos\theta_1\sin\psi(f_{1x} - f_2\cos\alpha_1 + f_{4x} - f_3\cos\alpha_2) + \frac{1}{2}L_1\cos\theta_1\cos\psi(f_{4z} + f_3\sin\alpha_2 - f_{1z} - f_2\sin\alpha_1) = 0,\qquad (27c)$$

The sine and cosine functions of the angles $\alpha_1$ and $\alpha_2$ in Equations (27a)-(27c) can be written as $$\sin\alpha_1 = \frac{2L_1\sin\theta_1 - L_1\sin\varphi_2 - z - \frac{1}{2}L_1\cos\theta_1\sin\psi}{L_1},\qquad (A7)$$

$$\cos\alpha_1 = \frac{x + \frac{1}{2}L_1\cos\theta_1\cos\psi - \frac{1}{2}L_1\cos\theta_1 + L_1\cos\varphi_2}{L_1},$$

-continued $$\sin\alpha_2 = \frac{2L_1\sin\theta_1 - L_1\sin\varphi_3 - z + \frac{1}{2}L_1\cos\theta_1\sin\psi}{L_1}, \tag{A8}$$

$$\cos\alpha_2 = \frac{-\frac{1}{2}L_1\cos\theta_1 + L_1\cos\varphi_3 - x + \frac{1}{2}L_1\cos\theta_1\cos\psi}{L_1}.$$

For the rods $A_2C_1$ and $A_3C_4$, the force and moment equilibrium equations can be written as Equations 28a to 28f below where $f_{5x}$ and $f_{5z}$ are the forces on the joint $C_1$, $f_{6x}$ and $f_{6z}$ represent the forces on the joint $C_4$, $f_{s2}$ and $f_{s4}$ are the forces of the springs "2" and "4", $\alpha_3$ and $\alpha_4$ denote the inclination angles of the rods $A_2C_1$ and $A_3C_4$, and $\beta_1$ and $\beta_2$ are the angles between forces $f_{s2}$ and $f_{s4}$ and the horizontal direction. The detailed expressions of sine and cosine functions of the inclination angles $\alpha_3$, $\alpha_4$, $\beta_1$ and $\beta_2$ can also be obtained.

$$f_{1x} - f_{s2}\cos\beta_1 - f_{5x} = 0, \tag{28a}$$

$$f_{1z} + f_{s2}\sin\beta_1 - f_{5z} = 0, \tag{28b}$$

$$f_{s2}\cos\beta_1\frac{1}{2}L_2\sin\alpha_3 + \tag{28c}$$
$$f_{s2}\sin\beta_1\frac{1}{2}L_2\cos\alpha_3 - f_{5z}L_2\cos\alpha_3 + f_{5x}L_2\sin\alpha_3 = 0,$$

$$f_{4x} - f_{s4}\cos\beta_2 - f_{6x} = 0, \tag{28d}$$

$$f_{4z} + f_{s4}\sin\beta_2 - f_{6z} = 0, \tag{28e}$$

$$f_{s4}\cos\beta_2\frac{1}{2}L_2\sin\alpha_4 + \tag{28f}$$
$$f_{s4}\sin\beta_2\frac{1}{2}L_2\cos\alpha_4 - f_{6z}L_2\cos\alpha_4 + f_{6x}L_2\sin\alpha_4 = 0,$$

The sine and cosine functions of the angles $\alpha_3$, $\alpha_4$, $\beta_1$ and $\beta_2$ in Equations (28a)-(28f) are expressed as $$\sin\alpha_3 = \frac{2L_2\sin\theta_2 - L_2\sin\varphi_1 - z - \frac{1}{2}L_1\cos\theta_1\sin\psi}{L_2}, \tag{A9}$$

$$\cos\alpha_3 = \frac{\frac{1}{2}L_1\sin\theta_1 + L_2\cos\varphi_1 - x - \frac{1}{2}L_1\cos\theta_1\cos\psi}{L_2},$$

$$\sin\alpha_4 = \frac{2L_2\sin\theta_2 - L_2\sin\varphi_4 - z + \frac{1}{2}L_1\cos\theta_1\sin\psi}{L_2}, \tag{A10}$$

$$\cos\alpha_4 = \frac{x - \frac{1}{2}L_1\cos\theta_1\cos\psi + \frac{1}{2}L_1\cos\theta_1 + L_2\cos\varphi_4}{L_2}, $$

$$\sin\beta_1 = \frac{2L_1\sin\theta_1 - L_1\sin\varphi_3 - \frac{1}{2}z - \frac{1}{4}L_1\cos\theta_1\sin\psi - L_2\sin\theta_2 + \frac{1}{2}L_2\sin\varphi_1}{l_{21}}, \tag{A11}$$

$$\cos\beta_1 = \frac{\frac{1}{2}x + \frac{1}{4}L_1\cos\theta_1\cos\psi + \frac{1}{4}L_1\cos\theta_1 + \frac{1}{2}L_2\cos\varphi_1 + \frac{1}{2}L_1\cos\theta_1 - L_1\cos\varphi_3}{l_{21}}, \tag{A12}$$

-continued $$\sin\beta_2 = \frac{2L_1\sin\theta_1 - L_1\sin\varphi_2 - \frac{1}{2}z + \frac{1}{4}L_1\cos\theta_1\sin\psi - L_2\sin\theta_2 + \frac{1}{2}L_2\sin\varphi_4}{l_{41}}, \tag{A13}$$

$$\cos\beta_2 = \frac{\frac{1}{2}L_1\cos\theta_1 - L_1\cos\varphi_2 - \frac{1}{2}x + \frac{1}{4}L_1\cos\theta_1\cos\psi + \frac{1}{4}L_1\cos\theta_1 + \frac{1}{2}L_2\cos\varphi_4}{l_{41}}. \tag{A14}$$

For the static analysis of the rods $C_1E_1E_2$ and $C_4E_5E_4$ as shown in FIG. 5(c), the moment equilibrium equations of the joints $E_1$ and $E_5$ can be expressed as Equations 29a and 29b below in which $f_{s3}$ and $f_{s5}$ denote the forces of the springs "3" and "5", $f_{o1}$ and $f_{o2}$ are the tension forces of the springs "6" and "7", and $\beta_3$ and $\beta_4$ are the angles between the forces $f_{s3}$ and $f_{s5}$ and the horizontal direction.

$$f_{5x}L_2\sin\varphi_1 + f_{5z}L_2\cos\varphi_1 - \tag{29a}$$
$$\frac{1}{2}f_{s3}\cos\beta_3L_2\sin\varphi_1 - \frac{1}{2}f_{s3}\sin\beta_3L_2\cos\varphi_1 = f_{o1}h_1,$$

$$f_{6x}L_2\sin\varphi_4 + f_{6z}L_2\cos\varphi_4 - \tag{29b}$$
$$\frac{1}{2}f_{s5}\cos\beta_4L_2\sin\varphi_4 - \frac{1}{2}f_{s5}\sin\beta_4L_2\cos\varphi_4 = f_{o2}h_2,$$

The sine and cosine functions of the angles $\beta_3$ and $\beta_4$ in Equations (29a) and (29b) are written as $$\sin\beta_3 = \frac{L_1\sin\varphi_3 - \frac{1}{2}L_2\sin\varphi_1}{l_{31}}, \tag{A15}$$

$$\cos\beta_3 = \frac{L_1\cos\theta_1 + \frac{1}{2}L_2\cos\varphi_1 - L_1\cos\varphi_3}{l_{31}}, $$

$$\sin\beta_4 = \frac{L_1\sin\varphi_2 - \frac{1}{2}L_2\sin\varphi_4}{l_{51}}, \tag{A16}$$

$$\cos\beta_4 = \frac{L_1\cos\theta_1 + \frac{1}{2}L_2\cos\varphi_4 - L_1\cos\varphi_2}{l_{51}}. $$

The distances $h_1$ and $h_2$ from the action line of forces $f_{o1}$ and $f_{o2}$ to joints $E_1$ and $E_5$ can be expressed by $$h_1 = \frac{\frac{1}{2}L_1L_3\cos\theta_1\sin(\theta_3 + \theta_2 - \varphi_1)}{\sqrt{L_3^2 + \frac{1}{4}L_1^2\cos^2\theta_1 - L_1L_3\cos\theta_1\cos(\theta_3 + \theta_2 - \varphi_1)}}, \tag{30}$$

$$h_2 = \frac{\frac{1}{2}L_1L_3\cos\theta_1\sin(\theta_3 + \theta_2 - \varphi_4)}{\sqrt{L_3^2 + \frac{1}{4}L_1^2\cos^2\theta_1 - L_1L_3\cos\theta_1\cos(\theta_3 + \theta_2 - \varphi_4)}}. $$

For the joints $C_2$ and $C_3$, the force equilibrium equations can be written as Equations 31a to 31d below where $f_9$ and $f_{10}$ are the internal forces along the rods $C_2E_5$ and $C_3E_1$, $\beta_h$ represents the angle between the force $f_h$ of the spring "1" and the horizontal direction, and it can be calculated by Equation 32 below.

$$f_h\cos\beta_h - f_{s2}\cos\beta_1 - f_{s3}\cos\beta_3 - f_3\cos\alpha_2 - f_9\cos\varphi_3 = 0, \quad (31a)$$

$$f_h\cos\beta_h + f_{s2}\sin\beta_1 - f_{s3}\sin\beta_3 - f_3\sin\alpha_2 + f_9\sin\varphi_3 = 0, \quad (31b)$$

$$f_h\cos\beta_h - f_{s4}\cos\beta_2 - f_{s5}\cos\beta_4 - f_2\cos\alpha_1 - f_{10}\cos\varphi_2 = 0, \quad (31c)$$

$$f_h\sin\beta_h - f_{s4}\sin\beta_2 + f_{s5}\sin\beta_4 + f_2\sin\alpha_1 - f_{10}\sin\varphi_2 = 0, \quad (31d)$$

$$\sin\beta_h = \frac{L_1\sin\varphi_2 - L_1\sin\varphi_3}{l_{11}}, \quad (32)$$

$$\cos\beta_h = \frac{L_1\cos\varphi_3 + L_1\cos\varphi_2 - L_1\cos\theta_1}{l_{11}}.$$

Based on the Equations (31a)-(31d), the internal forces $f_2$ and $f_3$ along the rods $A_2C_3$ and $A_3C_2$ can be expressed as $$f_2 = \frac{\begin{array}{l}f_{s4}(\cos\varphi_2\sin\beta_2 - \cos\beta_2\sin\varphi_2) - \\ f_{s5}(\cos\beta_4\sin\varphi_2 + \cos\varphi_2\sin\beta_4) + \\ f_h(\sin\varphi_2\cos\beta_h - \cos\varphi_2\sin\beta_h)\end{array}}{\sin\varphi_2\cos\alpha_1 + \cos\varphi_2\sin\alpha_1}, \quad (33a)$$

$$f_3 = \frac{\begin{array}{l}f_{s2}(\cos\varphi_3\sin\beta_1 - \cos\beta_1\sin\varphi_3) - \\ f_{s3}(\cos\beta_3\sin\varphi_3 + \cos\varphi_3\sin\beta_3) + \\ f_h(\sin\varphi_3\cos\beta_h + \cos\varphi_3\sin\beta_h)\end{array}}{\sin\varphi_3\cos\alpha_2 + \cos\varphi_3\sin\alpha_2}. \quad (33b)$$

In addition, by solving Equations (28c), (28f), (29a) and (29b), the forces $f_{5x}$, $f_{5z}$, $f_{6x}$ and $f_{6z}$ on the joints $C_1$ and $C_4$ can be obtained as $$f_{5x} = \frac{1}{2}\frac{f_{s3}L_2\cos\alpha_3(\sin\varphi_1\cos\beta_3 + \cos\varphi_1\sin\beta_3) - }{f_{s2}L_2\cos\varphi_1(\sin\alpha_3\cos\beta_1 + \cos\alpha_3\sin\beta_1) + 2f_{o1}h_1\cos\alpha_3}{L_2(\sin\varphi_1\cos\alpha_3 + \cos\varphi_1\sin\alpha_3)}, \quad (34a)$$

$$f_{5z} = \frac{1}{2}\frac{f_{s3}L_2\sin\alpha_3(\sin\varphi_1\cos\beta_3 + \cos\varphi_1\sin\beta_3) + }{f_{s2}L_2\sin\varphi_1(\sin\alpha_3\cos\beta_1 + \cos\alpha_3\sin\beta_1) + 2f_{o1}h_1\sin\alpha_3}{L_2(\sin\varphi_1\cos\alpha_3 + \cos\varphi_1\sin\alpha_3)}, \quad (34b)$$

$$f_{6x} = \frac{1}{2}\frac{f_{s5}L_2\cos\alpha_4(\sin\varphi_4\cos\beta_4 + \cos\varphi_4\sin\beta_4) - }{f_{s4}L_2\cos\varphi_4(\sin\alpha_4\cos\beta_2 + \cos\alpha_4\sin\beta_2) + 2f_{o2}h_2\cos\alpha_4}{L_2(\sin\varphi_4\cos\alpha_4 + \cos\varphi_4\sin\alpha_4)}, \quad (34c)$$

$$f_{6z} = \frac{1}{2}\frac{f_{s5}L_2\sin\alpha_4(\sin\varphi_4\cos\beta_4 + \cos\varphi_4\sin\beta_4) + }{f_{s4}L_2\sin\varphi_4(\sin\alpha_4\cos\beta_2 + \cos\alpha_4\sin\beta_2) + 2f_{o2}h_2\cos\alpha_4}{L_2(\sin\varphi_4\cos\alpha_4 + \cos\varphi_4\sin\alpha_4)}. \quad (34d)$$

In addition, by solving Equations (28c), (28f), (29a) and (29b), the forces $f_{5x}$, $f_{5z}$, $f_{6x}$ and $f_{6z}$ on the joints $C_1$ and $C_4$ can be obtained as $$f_{5x} = \frac{1}{2}\frac{f_{s3}L_2\cos\alpha_3(\sin\varphi_1\cos\beta_3 + \cos\varphi_1\sin\beta_3) - }{f_{s2}L_2\cos\varphi_1(\sin\alpha_3\cos\beta_1 + \cos\alpha_3\sin\beta_1) + 2f_{o1}h_1\cos\alpha_3}{L_2(\sin\varphi_1\cos\alpha_3 + \cos\varphi_1\sin\alpha_3)}, \quad (34a)$$

$$f_{5z} = \frac{1}{2}\frac{f_{s3}L_2\sin\alpha_3(\sin\varphi_1\cos\beta_3 + \cos\varphi_1\sin\beta_3) + }{f_{s2}L_2\sin\varphi_1(\sin\alpha_3\cos\beta_1 + \cos\alpha_3\sin\beta_1) + 2f_{o1}h_1\sin\alpha_3}{L_2(\sin\varphi_1\cos\alpha_3 + \cos\varphi_1\sin\alpha_3)}, \quad (34b)$$

$$f_{6x} = \frac{1}{2}\frac{f_{s5}L_2\cos\alpha_4(\sin\varphi_4\cos\beta_4 + \cos\varphi_4\sin\beta_4) - }{f_{s4}L_2\cos\varphi_4(\sin\alpha_4\cos\beta_2 + \cos\alpha_4\sin\beta_2) + 2f_{o2}h_2\cos\alpha_4}{L_2(\sin\varphi_4\cos\alpha_4 + \cos\varphi_4\sin\alpha_4)}, \quad (34c)$$

-continued $$f_{6z} = \frac{1}{2}\frac{\begin{array}{l}f_{s5}L_2\sin\alpha_4(\sin\varphi_4\cos\beta_4 + \cos\varphi_4\sin\beta_4) + \\ f_{s4}L_2\sin\varphi_4(\sin\alpha_4\cos\beta_2 + \cos\alpha_4\sin\beta_2) + 2f_{o2}h_2\sin\alpha_4\end{array}}{L_2(\sin\varphi_4\cos\alpha_4 + \cos\varphi_4\sin\alpha_4)}. \quad (34d)$$

Substituting Equations (33a), (33b) and (B1)-(B4) into Equations (35a)-(35c) and considering Equations (A7)-(A16), (30) and (32), the detailed expressions of the horizontal force $F_x$, vertical force $F_z$ and bending moment $M_\psi$ can be obtained. The static analyses of the loading capacity, static stiffness, and QZS zone of the anti-vibration unit 100 in all three directions can be carried out.

The inventors' analysis of the parametric influence will now be discussed. For the anti-vibration unit 100 with structural parameters $L_2=0.1$ m, $L_3=0.05$ m, $\theta_2=\pi/3$, $\theta_3=\pi/8$ and $k_h=400$ N/m, FIG. 6 displays the effects of the spring stiffness $k_s$ and $k_o$, lengths $L_1$ and $L_2$, and the ratio $L_1/L_2$ on the force-displacement curve $F_x$. It can be noted from FIG. 6(*a*) that the anti-vibration unit 100 with $k_s=0$ N/m exhibits positive stiffness throughout the stroke, which means that the whole motion range is in the effective working range. Moreover, the equivalent stiffness is nonlinear and changed from a bigger positive value, via zero and to a negative value, and a larger $k_s$ leads to a smaller loading capacity in the x-direction. The effective working zones of the anti-vibration unit 100 with $k_s=300$ N/m, 600 N/m and 900 N/m are in the ranges $-0.034$ m$\leq$x$\leq$0.034 m, $-0.031$ m$\leq$x$\leq$0.031 m and $-0.029$ m$\leq$x$\leq$0.029 m. That is to say, the effective working range decreases with the increase of $k_s$.

Figure 6:
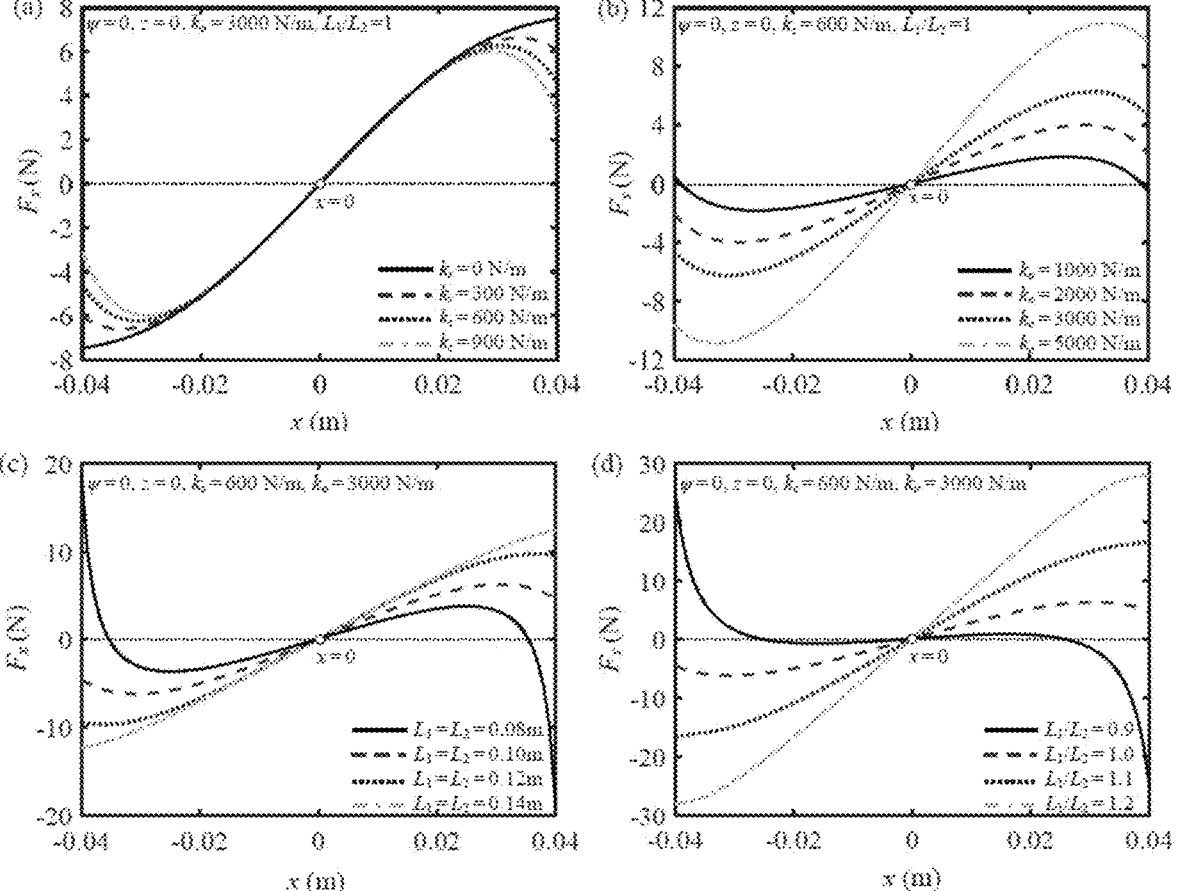
FIG. 6 shows nonlinear force-displacement curves of an example anti-vibration unit under (a) different spring stiffness $k_s$, (b) different spring stiffness $k_o$, (c) different lengths $L_1$ and $L_2$ and (d) different ratios $L_1/L_2$, according to an aspect of the present disclosure.

It was found from FIG. 6(*b*) that with the increase of $k_o$, the loading capacity increases significantly with larger stiffness in the x-direction, and the width of the QZS zone decreases. The effective working zones of the anti-vibration unit 100 with $k_o=1000$ N/m, 2000 N/m, 3000 N/m and 5000 N/m are in the ranges $-0.026$ m$\leq$x$\leq$0.026 m, $-0.029$ m$\leq$x$\leq$0.029 m, $-0.032$ m$\leq$x$\leq$0.032 m and $-0.034$ m$\leq$x$\leq$0.034 m, which means that a lager spring stiffness $k_o$ leads to a wider effective working range. In addition, under different spring stiffness $k_o$, the stiffness of the anti-vibration unit 100 can be flexibly changed from positive, zero or quasi-zero to negative stiffness properties.

The force-displacement curves of the anti-vibration unit 100 under different ratios $L_1/L_2$ and lengths $L_1$ and $L_2$ of rods are shown in FIGS. 6(*c*) and 6(*d*), in which the nonlinear stiffness properties similar to the FIG. 6(*b*) can be observed and increasing the lengths $L_1$ and $L_2$ of rods or the ratio $L_1/L_2$ can effectively improve the equivalent stiffness and loading capacity of the anti-vibration unit 100 in the x direction.

Figure 7:
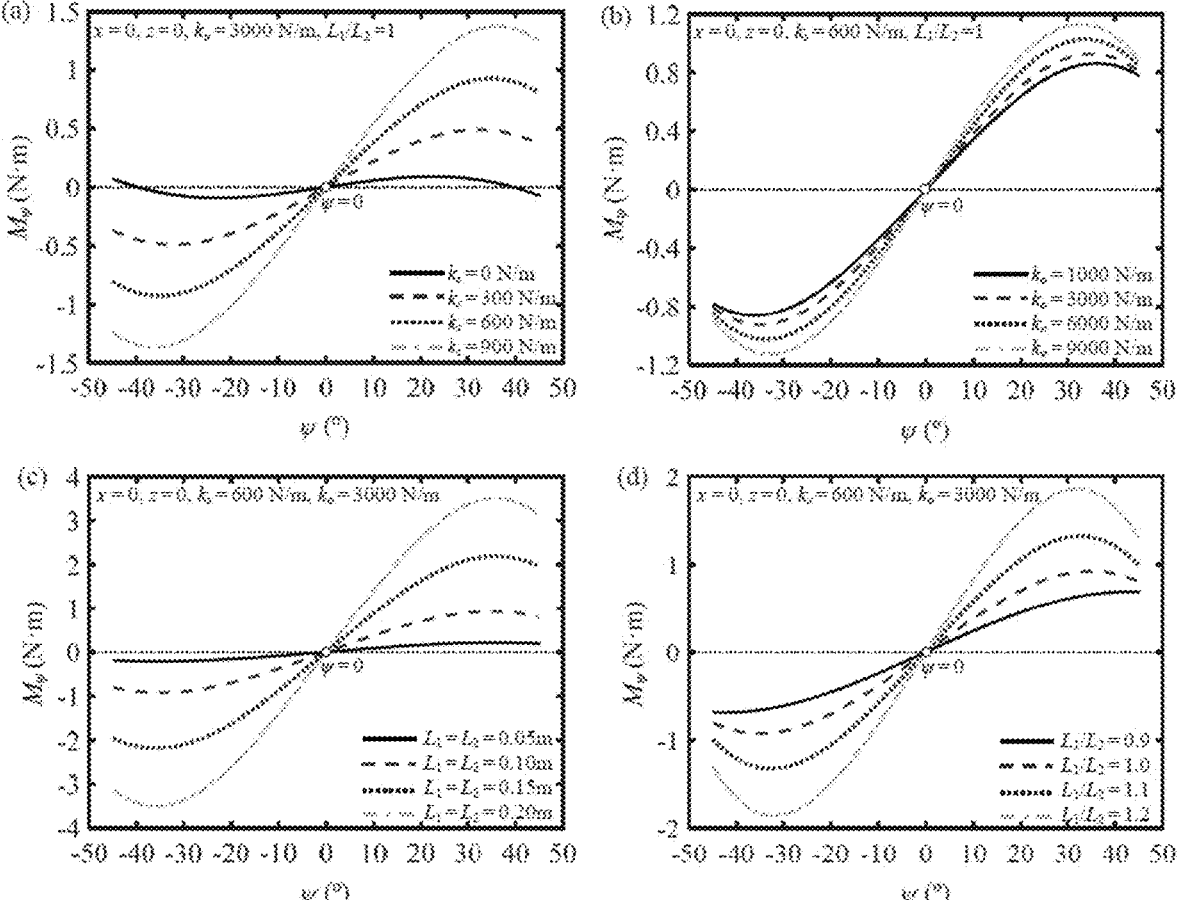
FIG. 7 shows bending moment and rotation angle curves of an example anti-vibration unit under (a) different spring stiffness $k_s$, (b) different spring stiffness $k_o$, (c) different lengths $L_1$ and $L_2$ and (d) different ratios $L_1/L_2$, according to an aspect of the present disclosure.

The nonlinear bending moment and rotation angle curves of the anti-vibration unit 100 with different spring stiffness $k_s$ and $k_o$, lengths $L_1$ and $L_2$, and ratios $L_1/L_2$ are shown in FIG. 7. For $L_2=0.1$ m, $L_3=0.05$ m, $\theta_2=\pi/3$, $\theta_3=\pi/8$ and $k_h=400$ N/m, FIG. 7(*a*) displays the influence of $k_s$ on the bending moment and rotation angle curve of the anti-vibration unit 100. It was found that the anti-vibration unit 100 with different $k_s$ exhibits different stiffness values, which can be positive, zero or quasi-zero and negative. The loading capacity increases with the increase of $k_s$, and different QZS zones of the anti-vibration unit 100 under different $k_s$ can be easily achieved. Moreover, the effective working zones of the anti-vibration unit 100 with $k_s=0$ N/m, 300 N/m, 600 N/m and 900 N/m are in the ranges $-22°\leq\psi\leq22°$, $-32°\leq\psi\leq32°$, $-35°\leq\psi\leq35°$ and $-37°\leq\psi\leq37°$, which indicates that a lager spring stiffness $k_s$ results in a wider effective working range. Besides, it can be noted from FIG. 7(b) that, with the increase of the spring stiffness $k_o$, the loading capacity of the anti-vibration unit 100 increases, but the effective working range decreases slightly. FIGS. 7(c) and 7(d) exhibit the effects of the lengths $L_1$ and $L_2$ and ratio $L_1/L_2$ on the bending moment and rotation angle curves of the anti-vibration unit 100. It was noticed that the beneficial nonlinear stiffness properties similar to that in FIG. 7(a) can be maintained and adjusting the lengths $L_1$ and $L_2$ or ratio $L_1/L_2$ can effectively improve the stiffness and loading capacity and obtain different QZS characteristics, which is beneficial to the design of QZS isolators.

Figure 8:
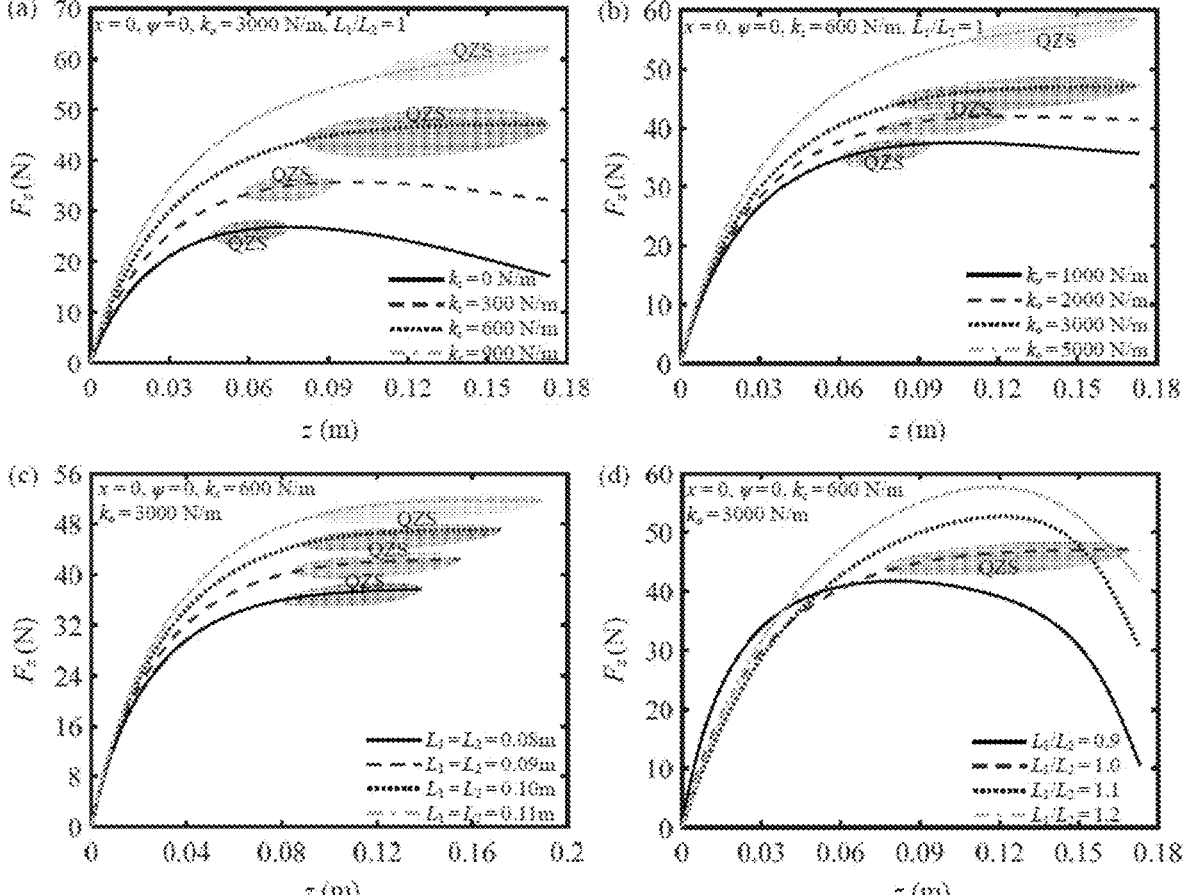
FIG. 8 shows nonlinear force-displacement curves of an example anti-vibration unit under (a) different spring stiffness $k_s$, (b) different spring stiffness $k_o$, (c) different lengths $L_1$ and $L_2$ and (d) different ratios $L_1/L_2$, according to an aspect of the present disclosure.

For the parameters $L_2=0.1$ m, $L_3=0.05$ m, $\theta_2=\pi/3$, $\theta_3=\pi/8$ and $k_h=400$ N/m, FIG. 8 shows the effects of the spring stiffness $k_s$ and $k_o$, the lengths $L_1$ and $L_2$ and the ratio $L_1/L_2$ on the force-displacement curve $F_z$. It was found from FIG. 8(a) that the anti-vibration unit 100 with $k_s=0$ N/m and 300 N/m exhibited negative stiffness with small QZS zones, the anti-vibration unit 100 with $k_s=600$ N/m exhibited QZS effect with large stroke, and the anti-vibration unit 100 with $k_s=900$ N/m exhibited positive stiffness and QZS characteristics throughout the compression process. That is to say, with the increase of $k_s$, the negative stiffness gradually increased to zero and positive stiffness.

In addition, it can be noted that the QZS zone of the anti-vibration unit 100 with $k_s=600$ N/m is larger than those of the anti-vibration unit 100 with other spring stiffness. The oblique springs with stiffness $k_s$ can enhance the loading capacity while exhibiting high-static and low-dynamic stiffness behaviors, which is beneficial to the vibration isolation. In addition, the influence of the spring stiffness $k_o$ on the force-displacement curves is almost the same as that of the spring stiffness $k_s$, which can be observed from FIG. 8(b). FIG. 8(c) displays the force-displacement relationships of the anti-vibration unit 100 under different lengths $L_1$ and $L_2$. It was found that the loading capacity and the QZS zone are enhanced with the increasing of the lengths $L_1$ and $L_2$, which demonstrated that high static and low dynamic stiffness characteristics can be obtained by adjusting the lengths $L_1$ and $L_2$.

The influence of the ratio $L_1/L_2$ on the force-displacement relationships of the anti-vibration unit 100 is shown in FIG. 8(d). For ratio $L_1/L_2=1$, the points $C_2$, $B_1$ and $D_1$ in the left side of the unit coincide and the points $C_3$, $B_2$ and $D_2$ in the right side of the unit also coincide at the maximum stroke position, and the four oblique springs with stiffness $k_s$ are fully compressed in the vertical direction. However, when $L_1/L_2$ is greater than or less than 1, the points $C_2$, $B_1$ and $D_1$, and the points $C_3$, $B_2$ and $D_2$ no longer coincide. The four springs with stiffness $k_s$ are horizontal at the maximum stroke position, and no vertical force is provided to the anti-vibration unit 100 at this time. Therefore, it was found from FIG. 8(d) that the anti-vibration unit 100 with $L_1/L_2=0.9$, 1.1 and 1.2 exhibited negative stiffness with small QZS zones and the anti-vibration unit 100 with $L_1/L_2=1$ exhibited QZS effect with large stroke.

Figure 9:
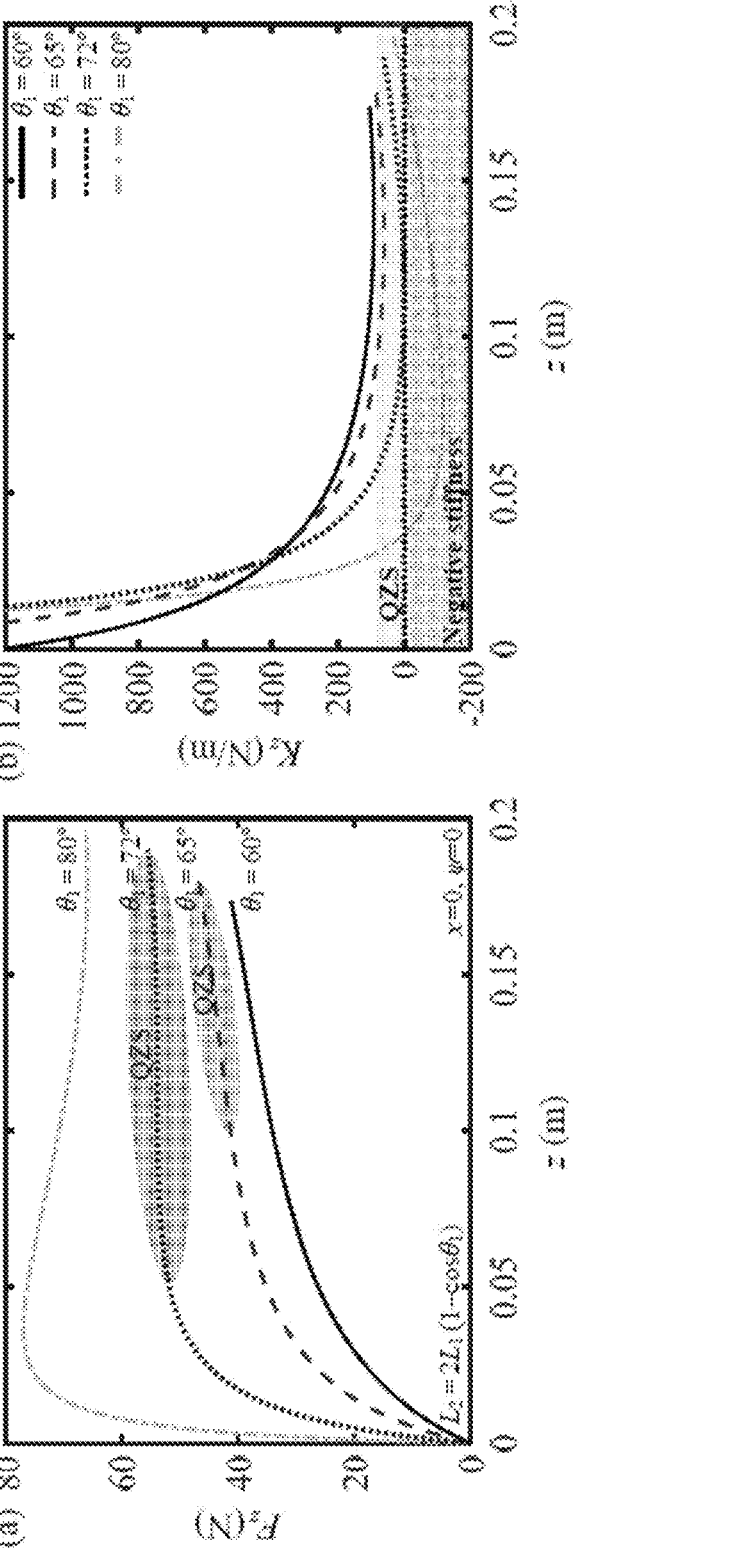
FIG. 9 shows nonlinear force-displacement curves and (b) nonlinear stiffness curves of an example anti-vibration unit under different assembly angles $\theta_1$, according to an aspect of the present disclosure.

For the structural parameters $L_1=0.1$ m, $L_3=0.05$ m, $\theta_3=\pi/8$, $k_h=200$ N/m, $k_s=800$ N/m and $k_o=200$ N/m, the nonlinear force-displacement and stiffness-displacement curves of the anti-vibration unit 100 along z-direction under different initial assembly angles $\theta_1$ were calculated and are shown in FIG. 9. The structure with different initial assembly angles has different stiffness values, which can be positive, quasi-zero, zero, or negative, as displayed in FIG. 9. Specifically, the anti-vibration unit 100 with initial assembly angle $\theta_1=60°$ exhibited positive stiffness throughout the compression process, the anti-vibration unit 100 with $\theta_1=65°$ and 72° exhibited QZS property with large stroke, and the anti-vibration unit 100 with $\theta_1=80°$ exhibited negative stiffness property. Additionally, compared with the anti-vibration unit 100 with $\theta_1=60°$ and $\theta_1=65°$, the anti-vibration unit 100 with $\theta_1=72°$ had higher loading capacity and wider QZS zone, which is beneficial to the design of QZS isolators and to realize ultra-low frequency vibration isolation.

Dynamic modeling and analysis of the anti-vibration unit will now be discussed. The kinetic energy T of the isolated system can be expressed as Equation 36 below where x, z and $\psi$ are the absolute motions in the horizontal, vertical and rotational directions, M and J are the mass and the rotational inertia of the isolation object. The horizontal, vertical and rotational excitations from the base are represented by $x_b$, $z_b$ and $\psi_b$. Therefore, the relative motions $x_r$, $z_r$ and $\psi_r$ along the horizontal, vertical and rotational directions can be expressed as Equation 37 below.

$$T = \frac{1}{2}M\dot{x}^2 + \frac{1}{2}M\dot{z}^2 + \frac{1}{2}J\dot{\psi}^2, \tag{36}$$

$$x_r = x - x_b, z_r = z - z_b, \psi_r = \psi - \psi_b. \tag{37}$$

The potential energy of the vibration system contains the elastic potential energy of the linear springs "1-7", which can be expressed by $$U = \frac{1}{2}k_h \Delta l_1^2 + \frac{1}{2}\sum_{i=2}^{5} k_s \Delta l_i^2 + \frac{1}{2}\sum_{j=6}^{7} k_o \Delta l_j^2. \tag{38}$$

The Lagrange principle is used to establish the nonlinear equations of motion of the anti-vibration unit 100 which can be written as Equations (39a) to (39c) below where $L=T-U$ is the Lagrange function. $Q_x$, $Q_z$ and $Q_\psi$ are the generalized forces which can be written as Equations (40a) to (40c) below where $c_{1x}$, $c_{1z}$ and $c_{1\psi}$ are the equivalent linear damping coefficients of each DOF, and $c_{2x}$, $c_{2z}$ and $c_{2\psi}$ are the rotational fiction damping coefficients of the rotational joints.

$$\frac{d}{dt}\left(\frac{\partial L}{\partial \dot{x}}\right) - \frac{\partial L}{\partial x} = Q_x, \tag{39a}$$

$$\frac{d}{dt}\left(\frac{\partial L}{\partial \dot{z}}\right) - \frac{\partial L}{\partial z} = Q_z, \tag{39b}$$

$$\frac{d}{dt}\left(\frac{\partial L}{\partial \dot{\psi}}\right) - \frac{\partial L}{\partial \psi} = Q_\psi, \tag{39c}$$

$$Q_x = -c_{1x}\dot{x}_r \frac{dx_r}{dx} - c_{2x}\left(\dot{\varphi}_1 \frac{d\varphi_1}{dx}\dot{\varphi}_2 \frac{d\varphi_2}{dx} + \right.$$
$$\left. \dot{\varphi}_3 \frac{d\varphi_3}{dx} + \dot{\varphi}_4 \frac{d\varphi_4}{dx} + \dot{\alpha}_1 \frac{d\alpha_1}{dx} + \dot{\alpha}_2 \frac{d\alpha_2}{dx} + \dot{\alpha}_3 \frac{d\alpha_3}{dx} + \dot{\alpha}_4 \frac{d\alpha_4}{dx}\right), \tag{40a}$$

$$Q_z = -c_{1z}\dot{z}_r \frac{dz_r}{dz} - c_{2z}\left(\dot{\varphi}_1 \frac{d\varphi_1}{dz} + \dot{\varphi}_2 \frac{d\varphi_2}{dz} + \right.$$
$$\left. \dot{\varphi}_3 \frac{d\varphi_3}{dz} + \dot{\varphi}_4 \frac{d\varphi_4}{dz} + \dot{\alpha}_1 \frac{d\alpha_1}{dz} + \dot{\alpha}_2 \frac{d\alpha_2}{dz} + \dot{\alpha}_3 \frac{d\alpha_3}{dz} + \dot{\alpha}_4 \frac{d\alpha_4}{dz}\right), \tag{40b}$$

$$Q_\psi = -c_{1\psi}\dot{\psi}_r \frac{d\psi_r}{d\psi} - c_{2\psi}\left(\dot{\varphi}_1 \frac{d\varphi_1}{d\psi} + \dot{\varphi}_2 \frac{d\varphi_2}{d\psi} + \right.$$
$$\left. \dot{\varphi}_3 \frac{d\varphi_3}{d\psi} + \dot{\varphi}_4 \frac{d\varphi_4}{d\psi} + \dot{\alpha}_1 \frac{d\alpha_1}{d\psi} + \dot{\alpha}_2 \frac{d\alpha_2}{d\psi} + \dot{\alpha}_3 \frac{d\alpha_3}{d\psi} + \dot{\alpha}_4 \frac{d\alpha_4}{d\psi}\right), \tag{40c}$$

Substituting the kinetic energy, potential energy and generalized forces into Equation (39), the equations of motion of the anti-vibration unit 100 can be obtained as $$M\ddot{x}_r + M\ddot{x}_b + k_h\Delta l_1 \frac{\partial \Delta l_1}{\partial x_r}\frac{\partial x_r}{\partial x} +$$

$$\sum_{i=2}^{5}k_s\Delta l_i \frac{\partial \Delta l_i}{\partial x_r}\frac{\partial x_r}{\partial x} + \sum_{j=6}^{7}k_o\Delta l_j \frac{\partial \Delta l_j}{\partial x_r}\frac{\partial x_r}{\partial x} =$$

$$-c_{1x}\dot{x}_r - c_{2x}\left\{\left(\frac{d\varphi_1}{dx_r}\right)^2 + \left(\frac{d\varphi_2}{dx_r}\right)^2 + \left(\frac{d\varphi_3}{dx_r}\right)^2 + \left(\frac{d\varphi_4}{dx_r}\right)^2 + \right.$$

$$\left.\left(\frac{d\alpha_1}{dx_r}\right)^2 + \left(\frac{d\alpha_2}{dx_r}\right)^2 + \left(\frac{d\alpha_3}{dx_r}\right)^2 + \left(\frac{d\alpha_4}{dx_r}\right)^2\right\}\dot{x}_r, \quad (41a)$$

$$M\ddot{z}_r + M\ddot{z}_b + k_h\Delta l_1 \frac{\partial \Delta l_1}{\partial z_r}\frac{\partial z_r}{\partial z} +$$

$$\sum_{i=2}^{5}k_s\Delta l_i \frac{\partial \Delta l_i}{\partial z_r}\frac{\partial z_r}{\partial z} + \sum_{j=6}^{7}k_o\Delta l_j \frac{\partial \Delta l_j}{\partial z_r}\frac{\partial z_r}{\partial z} =$$

$$-c_{1z}\dot{z}_r - c_{2z}\left\{\left(\frac{d\varphi_1}{dz_r}\right)^2 + \left(\frac{d\varphi_2}{dz_r}\right)^2 + \left(\frac{d\varphi_3}{dz_r}\right)^2 + \left(\frac{d\varphi_4}{dz_r}\right)^2 + \right.$$

$$\left.\left(\frac{d\alpha_1}{dz_r}\right)^2 + \left(\frac{d\alpha_2}{dz_r}\right)^2 + \left(\frac{d\alpha_3}{dz_r}\right)^2 + \left(\frac{d\alpha_4}{dz_r}\right)^2\right\}\dot{z}_r, \quad (41b)$$

$$J\ddot{\psi}_r + J\ddot{\psi}_b + k_h\Delta l_1 \frac{\partial \Delta l_1}{\partial \psi_r}\frac{\partial \psi_r}{\partial \psi} +$$

$$\sum_{i=2}^{5}k_s\Delta l_i \frac{\partial \Delta l_i}{\partial \psi_r}\frac{\partial \psi_r}{\partial \psi} + \sum_{j=6}^{7}k_o\Delta l_j \frac{\partial \Delta l_j}{\partial \psi_r}\frac{\partial \psi_r}{\partial \psi} =$$

$$-c_{1\psi}\dot{\psi}_r - c_{2\psi}\left\{\left(\frac{d\varphi_1}{d\psi_r}\right)^2 + \left(\frac{d\varphi_2}{d\psi_r}\right)^2 + \left(\frac{d\varphi_3}{d\psi_r}\right)^2 + \left(\frac{d\varphi_4}{d\psi_r}\right)^2 + \right.$$

$$\left.\left(\frac{d\alpha_1}{d\psi_r}\right)^2 + \left(\frac{d\alpha_2}{d\psi_r}\right)^2 + \left(\frac{d\alpha_3}{d\psi_r}\right)^2 + \left(\frac{d\alpha_4}{d\psi_r}\right)^2\right\}\dot{\psi}_r. \quad (41c)$$

Several nonlinear functions $f_x$, $f_z$, $f_\psi$, $f_{cx}$, $f_{cz}$ and $f_{c\psi}$ can be defined as $$f_x = k_h\Delta l_1 \frac{\partial \Delta l_1}{\partial x_r}\frac{\partial x_r}{\partial x} + \sum_{i=2}^{5}k_s\Delta l_i \frac{\partial \Delta l_i}{\partial x_r}\frac{\partial x_r}{\partial x} + \sum_{j=6}^{7}k_o\Delta l_j \frac{\partial \Delta l_j}{\partial x_r}\frac{\partial x_r}{\partial x}j, \quad (42a)$$

$$f_z = k_h\Delta l_1 \frac{\partial \Delta l_1}{\partial z_r}\frac{\partial z_r}{\partial z} + \sum_{i=2}^{5}k_s\Delta l_i \frac{\partial \Delta l_i}{\partial z_r}\frac{\partial z_r}{\partial z} + \sum_{j=6}^{7}k_o\Delta l_j \frac{\partial \Delta l_j}{\partial z_r}\frac{\partial z_r}{\partial z}, \quad (42b)$$

$$f_\psi = k_h\Delta l_1 \frac{\partial \Delta l_1}{\partial \psi_r}\frac{\partial \psi_r}{\partial \psi} + \sum_{i=2}^{5}k_s\Delta l_i \frac{\partial \Delta l_i}{\partial \psi_r}\frac{\partial \psi_r}{\partial \psi} + \sum_{j=6}^{7}k_o\Delta l_j \frac{\partial \Delta l_j}{\partial \psi_r}\frac{\partial \psi_r}{\partial \psi}, \quad (42c)$$

$$f_{cx} = \left(\frac{d\varphi_1}{dx_r}\right)^2 + \left(\frac{d\varphi_2}{dx_r}\right)^2 + \left(\frac{d\varphi_3}{dx_r}\right)^2 + \left(\frac{d\varphi_4}{dx_r}\right)^2 + \left(\frac{d\alpha_1}{dx_r}\right)^2 + \left(\frac{d\alpha_2}{dx_r}\right)^2 + \left(\frac{d\alpha_3}{dx_r}\right)^2 + \left(\frac{d\alpha_4}{dx_r}\right)^2 \quad (42d)$$

$$f_{cz} = \left(\frac{d\varphi_1}{dz_r}\right)^2 + \left(\frac{d\varphi_2}{dz_r}\right)^2 + \left(\frac{d\varphi_3}{dz_r}\right)^2 + \left(\frac{d\varphi_4}{dz_r}\right)^2 + \left(\frac{d\alpha_1}{dz_r}\right)^2 + \left(\frac{d\alpha_2}{dz_r}\right)^2 + \left(\frac{d\alpha_3}{dz_r}\right)^2 + \left(\frac{d\alpha_4}{dz_r}\right)^2 \quad (42e)$$

$$f_{c\psi} = \left(\frac{d\varphi_1}{d\psi_r}\right)^2 + \left(\frac{d\varphi_2}{d\psi_r}\right)^2 + \left(\frac{d\varphi_3}{d\psi_r}\right)^2 + \left(\frac{d\varphi_4}{d\psi_r}\right)^2 + \left(\frac{d\alpha_1}{d\psi_r}\right)^2 + \left(\frac{d\alpha_2}{d\psi_r}\right)^2 + \left(\frac{d\alpha_3}{d\psi_r}\right)^2 + \left(\frac{d\alpha_4}{d\psi_r}\right)^2. \quad (42f)$$

Substituting Equation (42) into (41), the equations of motion of the anti-vibration unit 100 can be further derived as $$M\ddot{x}_r + c_{1x}\dot{x}_r + c_{2x}f_{cx}\dot{x}_r + f_x = -M\ddot{x}_b, \quad (43a)$$

$$M\ddot{z}_r + c_{1z}\dot{z}_r + c_{2z}f_{cz}\dot{z}_r + f_z = -M\ddot{z}_b, \quad (43b)$$

$$J\ddot{\psi}_r + c_{1\psi}\dot{\psi}_r + c_{2\psi}f_{c\psi}\dot{\psi}_r + f_\psi = -J\ddot{\psi}_b. \quad (43c)$$

To analyze the equivalent stiffness in the 3-DOF, the variables in the other two DOFs can be assumed to be zero when the targeted variable is studied for simplification of discussions [55, 56]. That is to say, when $z_r$ is the objective variable, the variables $x_r$ and $\psi_r$ are equal to zero. Therefore, the equations of motion for the anti-vibration unit 100 can be expressed in the form of Equations (44a) to (44c) where Equations (45a) and (45b) further define variables.

$$M\ddot{x}_r + c_{1x}\dot{x}_r + c_{2x}f_{cx}(x_r)\dot{x}_r + f_x(x_r) = -M\ddot{x}_b, \quad (44a)$$

$$M\ddot{z}_r + c_{1z}\dot{z}_r + c_{2z}f_{cz}(z_r)\dot{z}_r + f_z(z_r) = -M\ddot{z}_b, \quad (44b)$$

$$J\ddot{\psi}_r + c_{1\psi}\dot{\psi}_r + c_{2\psi}f_{c\psi}(\psi_r)\dot{\psi}_r + f_\psi(\psi_r) = -J\ddot{\psi}_b, \quad (44c)$$

$$f_x(x_r) = f_x|_{z_r=0,\psi_r=0}, \ f_z(z_r) = f_z|_{x_r=0,\psi_r=0}, \ f_\psi(\psi_r) = f_\psi|_{z_r=0,x_r=0}, \quad (45a)$$

$$f_{cx}(x_r) = f_{cx}|_{z_r=0,\psi_r=0}, \ f_{cz}(z_r) = f_{cz}|_{x_r=0,\psi_r=0}, \ f_{c\psi}(\psi_r) = f_{c\psi}|_{z_r=0,x_r=0}. \quad (45b)$$

For linear systems, the stiffness is not affected by the equilibrium position. However, for the nonlinear systems, the change of the equilibrium position has a great effect on the dynamic characteristic. Therefore, the static equilibrium position is selected as the original point, and the displacements $x_e$, $z_e$ and $\psi_e$ of the static equilibrium position in x, z and $\psi$ directions can be written as Equation 46 below in which $x_{sd}$, $z_{sd}$ and $\psi_{sd}$ are the static deformations of the anti-vibration unit 100 due to the isolation object.

$$x_e = x_r - x_{sd}, \ z_e = z_r - z_{sd}, \ \psi_e = \psi_r - \psi_{sd}, \quad (46)$$

Substituting Equation (46) into Equations (44a)-(44c), the equations of motion can be expressed by $$M\ddot{x}_e + c_{1x}\dot{x}_e + c_{2x}f_{cx}(x_e)\dot{x}_e + f_x(x_e) = -M\ddot{x}_b, \quad (47a)$$

$$M\ddot{z}_e + c_{1z}\dot{z}_e + c_{2z}f_{cz}(z_e)\dot{z}_e + f_z(z_e) = -M\ddot{z}_b, \quad (47b)$$

$$J\ddot{\psi}_e + c_{1\psi}\dot{\psi}_e + c_{2\psi}f_{c\psi}(\psi_e)\dot{\psi}_e + f_\psi(\psi_e) = -J\ddot{\psi}_b. \quad (47c)$$

It can be found that Equations (47a)-(47c) are the decoupled equations of motion of the anti-vibration unit 100. Using polynomial fitting for nonlinear restoring force and nonlinear damping functions $f_x(x_e)$, $f_z(z_e)$, $f_\psi(\psi_e)$, $f_{cx}(x_e)$, $f_{cz}(z_e)$ and $f_{c\psi}(\psi_e)$, it can be obtained that $$\tilde{f}_x(x_e) = \xi_{x1}x_e + \xi_{x2}x_e^2 + \xi_{x3}x_e^3 + \xi_{x4}x_e^4, \quad (48a)$$

$$\tilde{f}_{cx}(x_e) = \eta_{x0} + \eta_{x1}x_e + \eta_{x2}x_e^2 + \eta_{x3}x_e^3 + \eta_{x4}x_e^4,$$

-continued $$\hat{f}_z(z_e) = \xi_{z1}z_e + \xi_{z2}z_e^2 + \xi_{z3}z_e^3 + \xi_{z4}z_e^4, \tag{48b}$$

$$\hat{f}_{cz}(z_e) = \eta_{z0} + \eta_{z1}z_e + \eta_{z2}z_e^2 + \eta_{z3}z_e^3 + \eta_{z4}z_e^4,$$

$$\hat{f}_\psi(\psi_e) = \xi_{\psi1}\psi_e + \xi_{\psi2}\psi_e^2 + \xi_{\psi3}\psi_e^3 + \xi_{\psi4}\psi_e^4, \tag{48c}$$

$$\hat{f}_{c\psi}(\psi_e) = \eta_{\psi0} + \eta_{\psi1}\psi_e + \eta_{\psi2}\psi_e^2 + \eta_{\psi3}\psi_e^3 + \eta_{\psi4}\psi_e^4.$$

For the case $k_h$=400 N/m, $k_s$=600 N/m, $k_o$=3000 N/m, $L_1$=$L_2$=0.1 m, $L_3$=0.05 m, $\theta_1$=$\theta_2$=$\pi/4$ and $\theta_3$=$\pi/8$, several comparisons of the original nonlinear functions $f_x(x_e)$, $f_z(z_e)$, $f_\psi(\psi_e)$, $f_{cx}(x_e)$, $f_{cz}(z_e)$, $f_{c\psi}(\psi_e)$ and polynomial fitting were carried out. It was found that the polynomial fitting results were consistent with the original functions, which demonstrated the correctness and feasibility of the polynomial fitting results in the given displacement range. It was seen that in the horizontal motion in the x direction, the damping effect was bigger around the equilibrium while it was smaller if the motion was far from the equilibrium. This nonlinear effect is important to stabilize vibration around equilibrium and help to quickly recover to the equilibrium when the upper platform is far away from its equilibrium. A similar advantage was seen in the rotational nonlinear damping effect.

Substituting the polynomial fitting results into Equation (47), the equations of motion of the anti-vibration unit 100 can be further expressed as $$M\ddot{x}_e + c_{1x}\dot{x}_e + c_{2x}\left(\eta_{x0} + \eta_{x1}x_e + \eta_{x2}x_e^2 + \eta_{x3}x_e^3 + \eta_{x4}x_e^4\right)\dot{x}_e + \tag{49a}$$

$$\xi_{x1}x_e + \xi_{x2}x_e^2 + \xi_{x3}x_e^3 + \xi_{x4}x_e^4 = -M\ddot{x}_b,$$

$$M\ddot{z}_e + c_{1z}\dot{z}_e + c_{2z}\left(\eta_{z0} + \eta_{z1}z_e + \eta_{z2}z_e^2 + \eta_{z3}z_e^3 + \eta_{z4}z_e^4\right)\dot{z}_e + \tag{49b}$$

$$\xi_{z1}z_e + \xi_{z2}z_e^2 + \xi_{z3}z_e^3 + \xi_{z4}z_e^4 = -M\ddot{z}_b,$$

$$J\ddot{\psi}_e + c_{1\psi}\dot{\psi}_e + c_{2\psi}\left(\eta_{\psi0} + \eta_{\psi1}\psi_e + \eta_{\psi2}\psi_e^2 + \eta_{\psi3}\psi_e^3 + \eta_{\psi4}\psi_e^4\right)\dot{\psi}_e + \tag{49c}$$

$$\xi_{\psi1}\psi_e + \xi_{\psi2}\psi_e^2 + \xi_{\psi3}\psi_e^3 + \xi_{\psi4}\psi_e^4 = -J\ddot{\psi}_b.$$

The equations of motion of the anti-vibration unit 100 in the three directions are similar, so they can be uniformly expressed as Equation 50 below. The detailed expressions of the parameters $y$, $\gamma_0$, $\gamma_1$, $\gamma_2$, $\gamma_3$, $\gamma_4$, $\lambda_1$, $\lambda_2$, $\lambda_3$ and $\lambda_4$ of the anti-vibration unit in the directions of x, z and $\psi$ are shown in the table of FIG. 10.

$$\ddot{y} + \gamma_0\dot{y} + \gamma_1 y\dot{y} + \gamma_2 y^2\dot{y} + \tag{50}$$

$$\gamma_3 y^3\dot{y} + \gamma_4 y^4\dot{y} + \lambda_1 y + \lambda_2 y^2 + \lambda_3 y^3 + \lambda_4 y^4 = -\ddot{y}_b.$$

Considering the vertical base excitation as $z_b$=$z_0$ cos($\omega$t), the nonlinear equation of motion, Equation (49b), can be solved by the method of multiple scales, and the steady-state responses for the anti-vibration unit 100 in the z-direction can be obtained. A small dimensionless parameter $\varepsilon$ and a detuning parameter $\sigma$ are introduced to characterize the different orders of amplitude. The nonlinear damping, nonlinear stiffness and external excitation terms are multiplied by $\varepsilon$ as Equations (51a) to (51d) below where $\omega_0$=$\sqrt{\lambda_1}$ denotes the natural frequency of the derived system.

$$\gamma_i = \varepsilon p_i, (i = 0, 1, 2, 3, 4), \tag{51a}$$

$$\lambda_i = \varepsilon q_i, (i = 2, 3, 4), \tag{51b}$$

$$\lambda_5 = \varepsilon q_5 = z_0\omega^2, \tag{51c}$$

$$\omega^2 = \omega_0^2 + \varepsilon\sigma, \tag{51d}$$

Substituting Equation (51) into Equation (50), the non-linear equation of motion of the anti-vibration unit 100 subjected to vertical base vibration can be further written as $$\ddot{y} + \omega^2 y = \varepsilon\left[-p_0\dot{y} - p_1 y\dot{y} - p_2 y^2\dot{y} - \right. \tag{52}$$

$$\left. p_3 y^3\dot{y} - p_4 y^4\dot{y} - q_2 y^2 - q_3 y^3 - q_4 y^4 + q_5\cos(\omega t) + \sigma y\right].$$

According to the method of multiple scales, the solution of Equation (52) can be written as Equation (53) below where $T_0$=t and $T_1$=$\varepsilon$t are the different time scales. By introducing the differential operators $D_0$=$\partial/\partial T_0$ and $D_1$=$\partial/\partial T_1$, the time derivatives can be expressed by Equation (54) below.

$$y = y_{10}(T_0, T_1) + \varepsilon y_{11}(T_0, T_1), \tag{53}$$

$$\frac{d}{dt} = D_0 + \varepsilon D_1, \frac{d^2}{dt^2} = (D_0 + \varepsilon D_1)^2. \tag{54}$$

Substituting Equations (53) and (54) into Equation (52) and equating the coefficients of $\varepsilon^0$ and $\varepsilon^1$ on both sides of the equation, one can obtain Equations (55a) and (55b).

$$D_0^2 y_{10} + \omega^2 y_{10} = 0, \tag{55a}$$

$$D_0^2 y_{11} + \omega^2 y_{11} = \tag{55b}$$

$$-2D_0D_1 y_{10} - \left(p_0 + p_1 y_{10} + p_2 y_{10}^2 + P_3 y_{10}^3 + P_4 y_{10}^4\right)D_0 y_{10} -$$

$$q_2 y_{10}^2 - q_3 y_{10}^3 - q_4 y_{10}^4 + \sigma y_{10} + q_5\cos(\omega t).$$

The solution of Equation (55a) can be expressed by Equation 56 below in which $i=\sqrt{-1}$ and "c.c" represents the complex conjugate of the preceding term. Substituting Equation (56) into Equation (55b) obtains Equation (57) below where $\overline{A}$ is the complex conjugate of A and "$N_s$" is the non-secular terms.

$$y_{10} = A(T_1)e^{i\omega T_0} + c.c, \tag{56}$$

$$D_0^2 y_{11} + \omega^2 y_{11} = \tag{57}$$

$$\left(-2i\omega D_1 A - p_0 i\omega A - p_2 i\omega A^2\overline{A} - 2p_4 i\omega A^3\overline{A}^2 - 3q_3 A^2\overline{A} + \sigma A + \frac{q_5}{2}\right)$$

$$e^{i\omega T_0} + N_s + c.c,$$

Eliminating the permanent terms in Equation (57) yields Equation 58 below where the complex function A can be expressed by Equation 59 in which $\alpha_1$ and $\vartheta$ denote the amplitude and phase.

$$-2i\omega D_1 A - p_0 i\omega A - p_2 i\omega A^2 \overline{A} - 2p_4 i\omega A^3 \overline{A}^2 - 3q_3 A^2 \overline{A} + \sigma A + \frac{q_5}{2} = 0. \quad (58)$$

$$A = \frac{1}{2} a_1(T_1) e^{i\vartheta(T_1)}, \quad (59)$$

According to Equations (54) and (58), one can obtain $$\frac{dA}{dt} = (D_0 + \varepsilon D_1)A = \varepsilon D_1 A, \quad (60a)$$

$$D_1 A = -\frac{1}{2} p_0 A - \frac{1}{2} p_2 A^2 \overline{A} - p_4 A^3 \overline{A}^2 + \frac{3q_3 A^2 \overline{A} i}{2\omega} - \frac{\sigma A i}{2\omega} - \frac{q_5 i}{4\omega}. \quad (60b)$$

Substituting Equations (59) and (60b) into Equation (60a) and separating real part and imaginary part, one can obtain $$\frac{1}{2}\dot{a}_1\cos\vartheta - \frac{1}{2}a_1\dot{\vartheta}\sin\vartheta = -\frac{\varepsilon}{4}p_0 a_1\cos\vartheta - \quad (61a)$$

$$\frac{\varepsilon}{16}p_2 a_1^3\cos\vartheta - \frac{\varepsilon}{32}p_4 a_1^5\cos\vartheta - \frac{3\varepsilon q_3 a_1^3}{16\omega}\sin\vartheta + \frac{\varepsilon a_1 \sigma}{4\omega}\sin\vartheta,$$

$$\frac{1}{2}\dot{a}_1\sin\vartheta + \frac{1}{2}a_1\dot{\theta}\cos\vartheta = -\frac{\varepsilon}{4}p_0 a_1\sin\vartheta - \quad (61b)$$

$$\frac{\varepsilon}{16}p_2 a_1^3\sin\vartheta - \frac{\varepsilon}{32}p_4 a_1^5\sin\vartheta + \frac{3\varepsilon q_3 a_1^3}{16\omega}\cos\vartheta - \frac{\varepsilon a_1 \sigma}{4\omega}\cos\vartheta - \frac{\varepsilon q_5}{4\omega}.$$

Based on the Equations (61a) and (61b), the explicit expressions of $\dot{\alpha}_1$ and $\dot{\vartheta}$ can be obtained as $$\dot{a}_1 = -\frac{\varepsilon}{2}p_0 a_1 - \frac{\varepsilon}{8}p_2 a_1^3 - \frac{\varepsilon}{16}p_4 a_1^5 - \frac{\varepsilon q_5}{2\omega}\sin\vartheta, \quad (62a)$$

$$\dot{\vartheta} = \frac{3\varepsilon q_3 a_1^2}{8\omega} - \frac{\varepsilon\sigma}{2\omega} - \frac{\varepsilon q_5}{2\omega a_1}\cos\vartheta. \quad (62b)$$

The condition for obtaining a stationary solution requires $\dot{\alpha}_1$ and $\dot{\vartheta}$ to be zero. By introducing the variable $s=\omega/\omega_0$ and eliminating the variable $\vartheta$, one can obtain $$\left(\gamma_0 a_1 + \frac{\gamma_2}{4}a_1^3 + \frac{\gamma_4}{8}a_1^5\right)^2 s^2 \omega_0^2 + \left[\frac{3}{4}\lambda_3 a_1^3 - (s^2 - 1)\omega_0^2 a_1\right]^2 = z_0^2 s^4 \omega_0^4, \quad (63)$$

By solving the Equation (63), the amplitude-frequency relationship curve of the displacement y can be obtained. In addition, the displacement y can be expressed in the form of trigonometric function as $$y = a_1\cos(\omega t + \vartheta). \quad (64)$$

Hence, the absolute displacement transmissibility $T_z$ can be calculated by $$T_z = \frac{\sqrt{a_1^2 + z_0^2 + 2a_1 z_0\cos\vartheta}}{|z_0|}. \quad (65)$$

With the same method, the absolute displacement transmissibility $T_x$ and $T_\psi$ of the anti-vibration unit 100 under base excitations $x_b = x_0\cos(\omega t)$ and $\psi_b = \psi_0\cos(\omega t)$ in the other two degrees of freedom (DOFs) can be expressed by $$T_x = \frac{\sqrt{a_1^2 + x_0^2 + 2a_1 x_0\cos\vartheta}}{|x_0|}, \quad T_\psi = \frac{\sqrt{a_1^2 + \psi_0^2 + 2a_1\psi_0\cos\vartheta}}{|\psi_0|}. \quad (66)$$

The vibration isolation performance of the anti-vibration unit 100 along different directions will now be discussed. The structural parameters such as the initial assembly angles $\theta_1$, $\theta_2$ and $\theta_3$, lengths of the rods, equivalent linear damping coefficient, rotational fiction damping coefficient, stiffness $k_h$, $k_s$ and $k_o$ of the springs can all be tuned to achieve better vibration isolation performance. In one example, the structural parameters of the anti-vibration unit 100 and external excitation amplitudes are fixed as: $k_h=400$ N/m, $k_s=600$ N/m, $k_o=3000$ N/m, $L_1=L_2=0.1$ m, $L_3=0.05$ m, $\theta_1=\theta_2=\pi/3$, $\theta_3=\pi/8$, $x_0=0.002$ m, $\psi_0=0.05$ rad, $z_0=0.005$ m.

Figure 11:
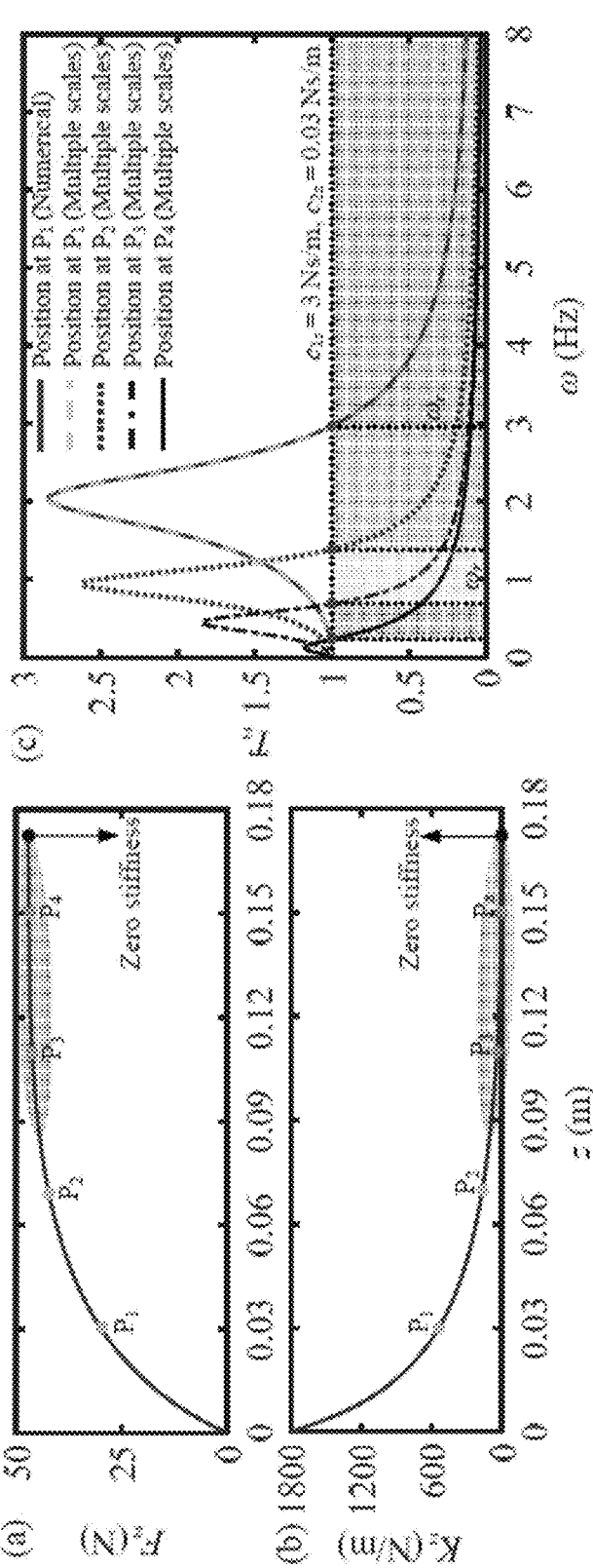
FIG. 11 shows for an example anti-vibration unit in the vertical direction (a) a nonlinear force-displacement relationship curve, (b) a nonlinear stiffness-displacement relationship curve, and (c) an absolute displacement transmissibility of the unit, according to an aspect of the present disclosure.

A lower resonant frequency means a wider vibration isolation band and a lower vibration isolation frequency. Therefore, the resonant frequency is a key parameter that determines the vibration isolation performance. The equilibrium position in the z-direction can be determined when the anti-vibration unit 100 is carrying a certain object, and the vertical vibration is carried out around the equilibrium position. FIG. 11 displays the vibration isolation performance of the anti-vibration unit 100 in the vertical direction under four different equilibrium positions $P_1$ ($z_{sd}=0.03$ m), $P_2$ ($z_{sd}=0.07$ m), $P_3$ ($z_{sd}=0.11$ m) and $P_4$ ($z_{sd}=0.15$ m). Additionally, the accuracy of the multiple scales method was verified by the numerical integration (i.e. Runge-Kutta method) directly on Equation (50), and the displacement transmissibility $T_z$ of the anti-vibration unit under equilibrium position $P_1$ obtained by the multiple scales method and numerical integration are also displayed in FIG. 11(c). It was found that the results obtained by the multiple scales method agreed well with that of the numerical integration, which verified that the multiple scales method was accurate and feasible for solving the present nonlinear dynamical system.

It was found from FIG. 11 that the loading capacity increased from equilibrium position $P_1$ to $P_4$, and the corresponding stiffness decreased from $P_1$ to $P_4$. The resonant frequencies with equilibrium positions $P_1$ and $P_2$ were 2.1 Hz and 0.99 Hz, and the corresponding peaks of the transmissibility were about 2.84 and 2.62. When the vertical excitation frequencies were greater than 2.98 Hz and 1.39 Hz, the transmissibility was less than 1. That is to say, the anti-vibration unit 100 with equilibrium positions $P_1$ and $P_2$ started to attenuate vibration after 2.98 Hz and 1.39 Hz. It is noted from FIG. 11(b) that when $P_3$ and $P_4$ were selected as the equilibrium positions, the anti-vibration unit 100 was in the state of QZS, and the corresponding resonant frequencies were 0.49 Hz and 0.16 Hz, which were lower than those of the anti-vibration unit 100 with equilibrium positions $P_1$ and $P_2$. The anti-vibration unit 100 with equilibrium position $P_4$ can attenuate vibration when the excitation frequency is larger than 0.24 Hz, which can achieve ultra-low frequency vibration isolation and widen the vibration isolation band. Moreover, it was found that, as the excitation frequency increased, the transmissibility was reduced to 0.5 at about 0.60 Hz, which means that the vibration isolation performance of the anti-vibration unit 100 in the state of QZS was better than the results of the anti-vibration unit 100 with equilibrium positions $P_1$ and $P_2$. For the anti-vibration unit 100, a QZS with a large stroke can be obtained, and the resonant frequency can be reduced by tuning the structural parameters.

Figure 12:
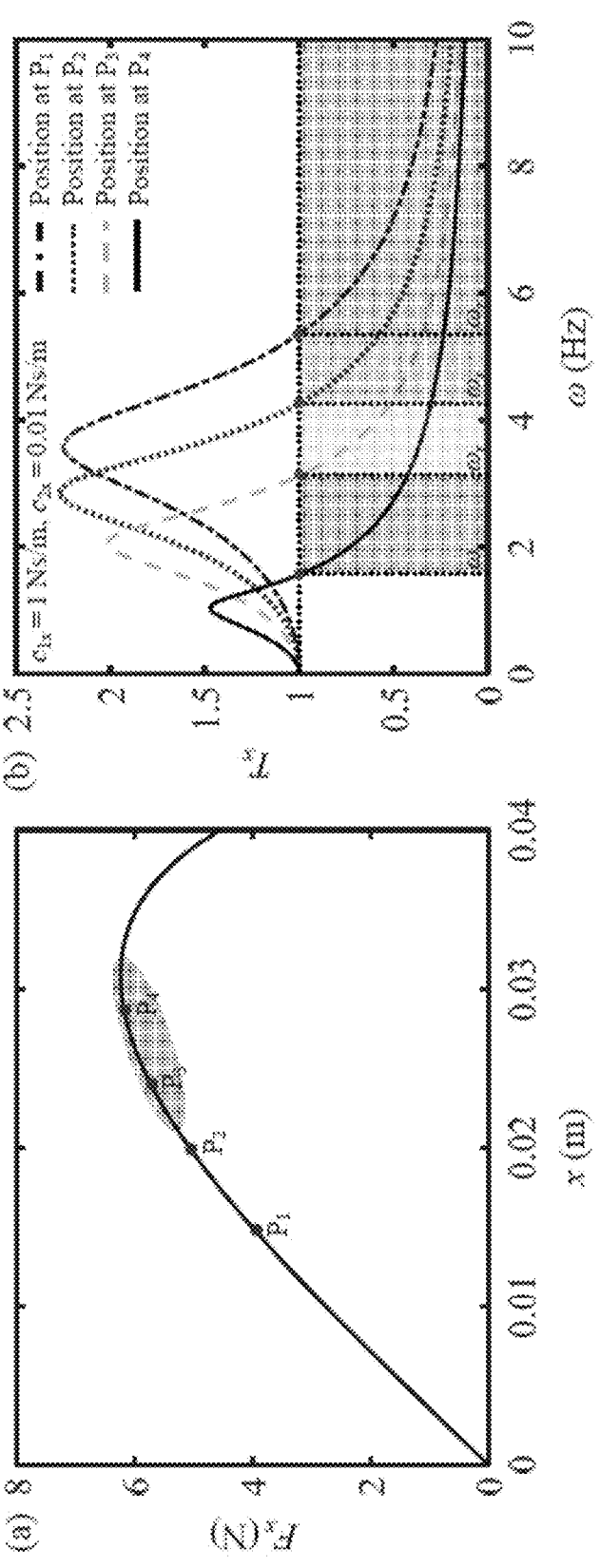
FIG. 12 shows for an example anti-vibration unit in the x-direction (a) a nonlinear force-displacement relationship curve and (b) an absolute displacement transmissibility of the unit, according to an aspect of the present disclosure.
Figure 13:
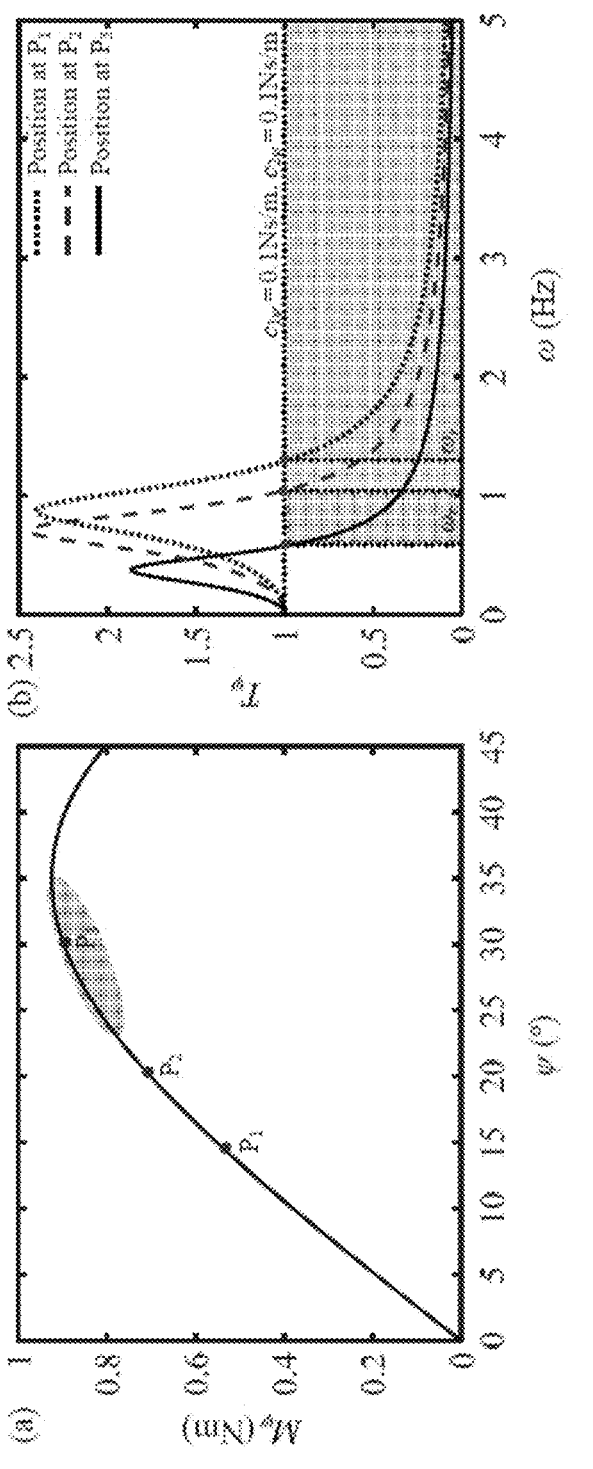
FIG. 13 shows for an example anti-vibration unit in the ψ-direction (a) a nonlinear force-displacement relationship curve and (b) an absolute displacement transmissibility of the unit, according to an aspect of the present disclosure.

FIG. 12 exhibits the vibration isolation performance of the anti-vibration unit 100 in the x-direction under four different equilibrium positions $P_1$ ($x_{sd}$=0.015 m), $P_2$ ($x_{sd}$=0.02 m), $P_3$ ($x_{sd}$=0.025 m) and $P_4$ ($x_{sd}$=0.029 m). It can be noted that from equilibrium position $P_1$ to $P_4$, the loading capacity increased and the corresponding stiffness decreased. The vibration isolation frequencies of the anti-vibration unit 100 in the x-direction under equilibrium positions $P_1$, $P_2$, $P_3$ and $P_4$ were equal to 5.35 Hz, 4.26 Hz, 3.12 Hz and 1.57 Hz, respectively. In addition, the resonant frequency and resonant peak of the anti-vibration unit 100 under equilibrium position $P_4$ were much lower than those of the anti-vibration unit 100 under equilibrium positions $P_1$, $P_2$ and $P_3$, which demonstrated that the anti-vibration unit 100 under equilibrium position $P_4$ exhibited a wider range of effective vibration isolation frequency. That is to say, the anti-vibration unit 100 can achieve good vibration isolation performance in the x-direction. In addition, the vibration isolation performance of the anti-vibration unit 100 in the $\psi$-direction under different equilibrium positions $P_1$ ($\psi_{sd}$=$\pi$/12), $P_2$ ($\psi_{sd}$=$\pi$/9) and $P_3$ ($\psi_{sd}$=$\pi$/6) is displayed in FIG. 13. It was found that the vibration isolation frequencies of the anti-vibration unit 100 under equilibrium positions $P_1$, $P_2$ and $P_3$ were equal to 1.31 Hz, 1.05 Hz and 0.58 Hz, which means that desirable vibration isolation performance in the $\psi$-direction can also be achieved.

Figure 14:
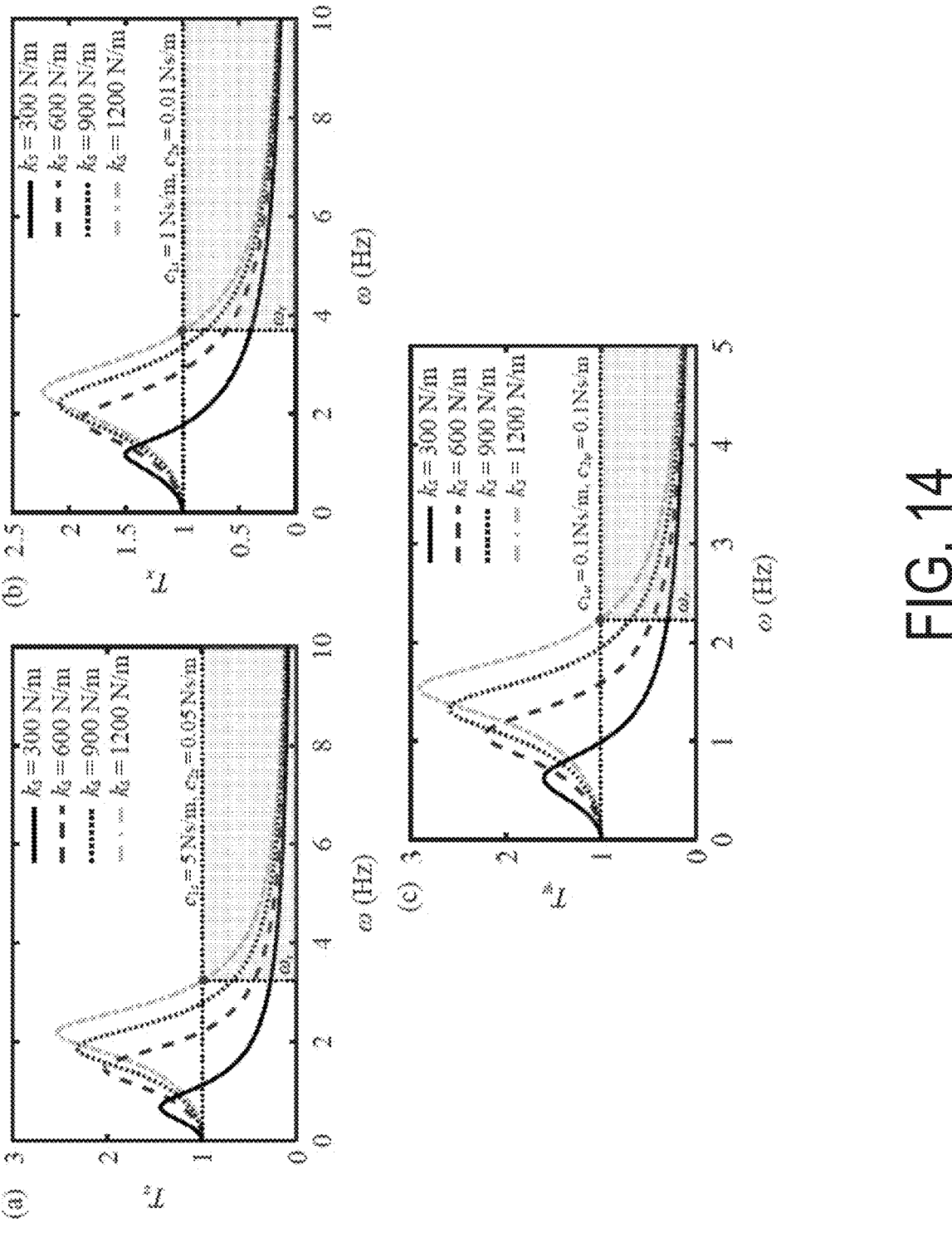
FIG. 14 shows graphs of displacement transmissibility of an example anti-vibration unit in (a) the vertical direction, (b) the horizontal direction, and (c) the rotational direction with different $k_s$, according to an aspect of the present disclosure.

FIG. 14 shows the absolute displacement transmissibility of the anti-vibration unit 100 in the three directions with different spring stiffness $k_s$. In the calculation, the preloads of the anti-vibration unit 100 corresponding to the vertical, horizontal and rotational static equilibrium positions were $F_z$=30 N, $F_x$=5.8 N and $M_\psi$=0.4 N·m. For the displacement transmissibility in the vertical direction, FIG. 14(a) shows that the resonant frequencies of the anti-vibration unit 100 with spring stiffness $k_s$=300 N/m, 600 N/m, 900 N/m and 1200 N/m were equal to 0.71 Hz, 1.45 Hz, 1.85 Hz and 2.20 Hz, and the vibration isolation frequencies of the anti-vibration unit 100 were 1.12 Hz, 2.22 Hz, 2.78 Hz and 3.23 Hz, respectively. That is to say, the resonant frequency and vibration isolation frequency became larger with the increasing spring stiffness $k_s$. For the other two directions as shown in FIGS. 14(b) and 14(c), the anti-vibration unit 100 with a small spring stiffness $k_s$ had lower vibration isolation frequency and resonant peak, which demonstrated that the smaller spring stiffness $k_s$ benefits the vibration isolation performance in all of the DOF directions.

Figure 15:
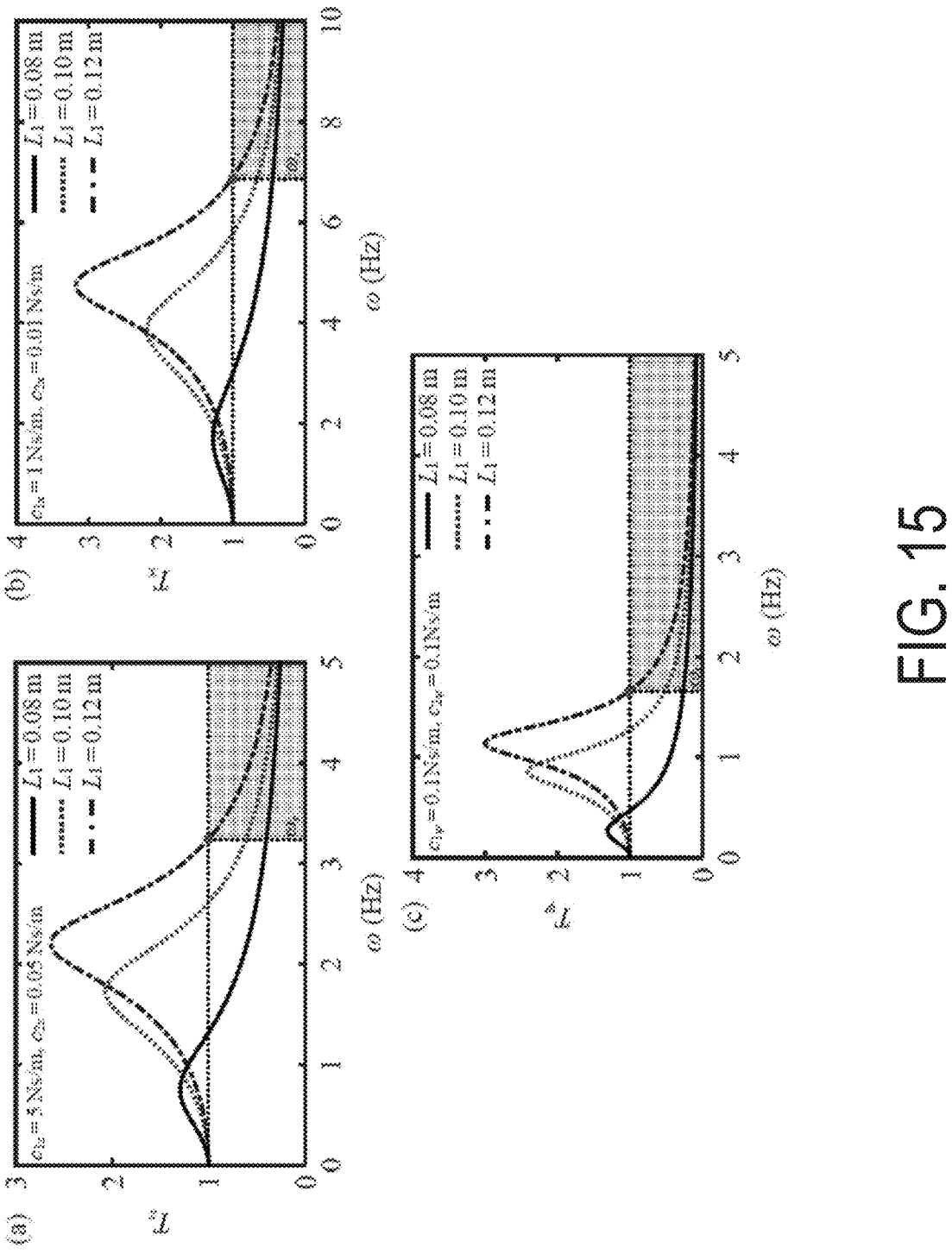
FIG. 15 shows graphs of displacement transmissibility of an example anti-vibration unit in (a) the vertical direction, (b) the horizontal direction, and (c) the rotational direction with different lengths $L_1$ of rods, according to an aspect of the present disclosure.

The influence of the length $L_1$ of rods on the vibration isolation performance of the anti-vibration unit 100 along the three directions was investigated and the results shown in FIG. 15. The preloads of the anti-vibration unit 100 corresponding to the vertical, horizontal and rotational static equilibrium positions were $F_z$=27N, $F_x$=3.6N and $M_\psi$=0.56 N·m. It can be seen from FIG. 15 that the length $L_1$ of rods can significantly influence the absolute displacement transmissibility of the anti-vibration unit 100 in all three directions. When the length $L_1$ of rods decreased, the resonant frequency, the vibration isolation frequency and the absolute displacement transmissibility sharply decreased, and the vibration isolation performance of the anti-vibration unit 100 in all DOF directions became better.

Figure 16:
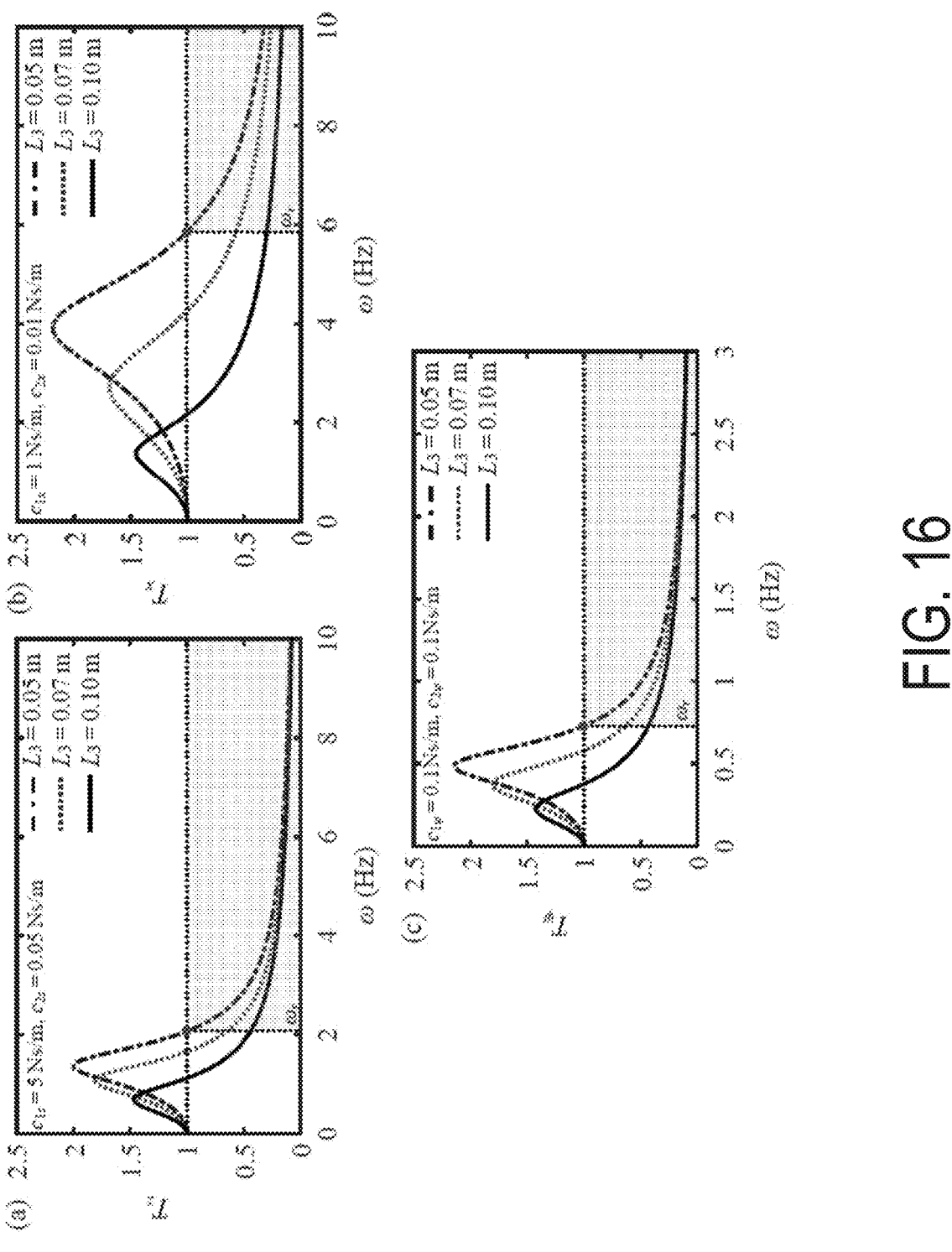
FIG. 16 shows graphs of displacement transmissibility of an example anti-vibration unit in (a) the vertical direction, (b) the horizontal direction, and (c) the rotational direction with different lengths $L_3$ of rods, according to an aspect of the present disclosure.

The vibration isolation performance of the anti-vibration unit 100 in all three directions under different rod lengths $L_3$ was evaluated and the results displayed in FIG. 16. To illustrate the excellent vibration isolation performance in all three directions, it was uniformly assumed that the preloads of the anti-vibration unit 100 corresponding to the vertical, horizontal and rotational static equilibrium positions were $F_z$=31 N, $F_x$=2.7 N and $M_\psi$=0.86 N·m. FIG. 16 shows that the vibration isolation performance of the anti-vibration unit 100 in all three directions was affected by the rod length $L_3$. Taking the displacement transmissibility in the vertical direction as an example, the resonant frequency and the vibration isolation frequency of the anti-vibration unit 100 with $L_3$=0.05 m were about 1.40 Hz and 2.10 Hz. When the length of the rods $L_3$=0.07 m, the resonant frequency and the vibration isolation frequency were decreased to 1.12 Hz and 1.66 Hz, and the resonant peak value was about 1.8. The resonant frequency was further reduced to about 0.71 Hz when $L_3$=0.10 m and the peak value was about 1.45, which is much lower than those of the anti-vibration unit 100 with other rod lengths. Therefore, the anti-vibration unit 100 with rod length $L_3$=0.1 m exhibited a wider range of vibration isolation frequency in all the DOF directions.

Figure 17:
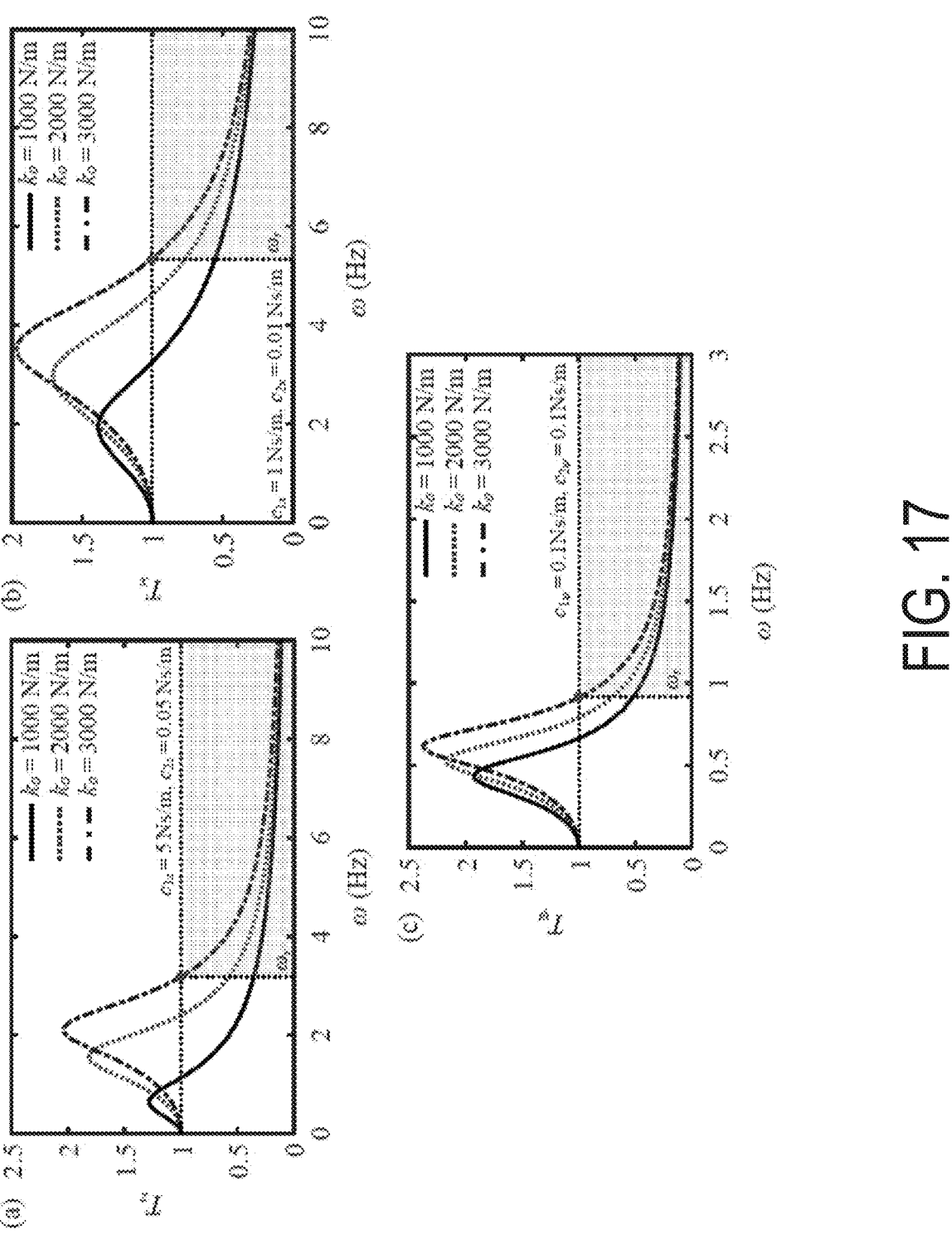
FIG. 17 shows graphs of displacement transmissibility of an example anti-vibration unit in (a) the vertical direction, (b) the horizontal direction, and (c) the rotational direction with different $k_o$, according to an aspect of the present disclosure.

FIG. 17 displays the absolute displacement transmissibility of the anti-vibration unit 100 in the three directions with different spring stiffness $k_o$. In the calculation, it was uniformly assumed that the preloads of the anti-vibration unit 100 corresponding to the vertical, horizontal and rotational static equilibrium positions were $F_z$=23 N, $F_x$=2.0 N and $M_\psi$=0.80 N·m. FIG. 17 shows that, with the decrease of the spring stiffness $k_o$, the resonant frequency and the resonant peak of the anti-vibration unit 100 in all three directions decreased significantly, and the width of the vibration isolation band increased. That is to say, the vibration isolation performance of the anti-vibration unit 100 in all three directions can be effectively improved by adjusting the spring stiffness $k_o$. Therefore, for the anti-vibration unit 100, QZS with a large stroke and a low resonant frequency can be obtained by tuning the structural parameters.

Figure 18:
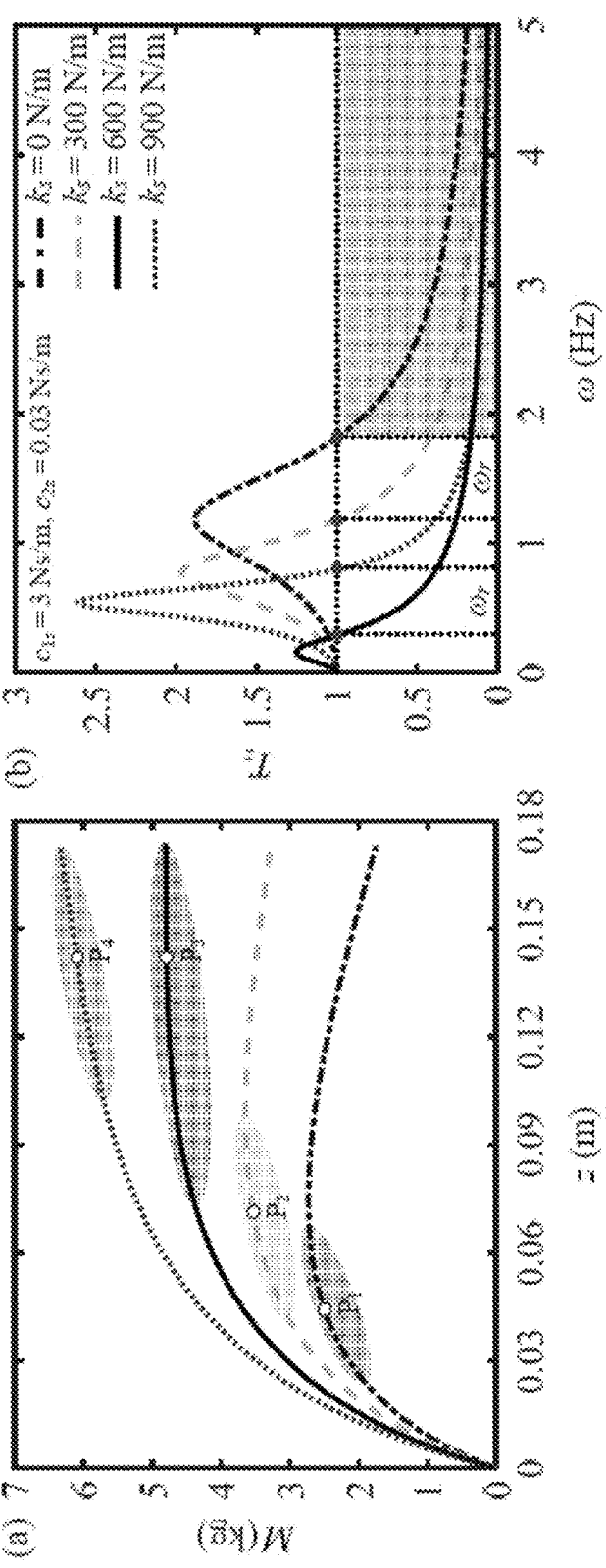
FIG. 18 shows graphs of (a) variations of an isolated mass with equilibrium position and (b) absolute displacement transmissibility of an example anti-vibration unit in the vertical direction under different $k_s$, according to an aspect of the present disclosure.

The following analysis focuses on the vibration isolation performance of the anti-vibration unit 100 in the vertical direction. FIG. 18 shows the variations of the isolated mass with equilibrium position and the absolute displacement transmissibility of the anti-vibration unit 100 along the vertical direction under different spring stiffness $k_s$. It can be observed from FIG. 18(a) that the equilibrium positions of the anti-vibration unit 100 with spring stiffness $k_s$=0 N/m, 300 N/m, 600 N/m and 900 N/m were $P_1$ ($z_{sd}$=0.045 m), $P_2$ ($z_{sd}$=0.075 m), $P_3$ ($z_{sd}$=0.14 m) and $P_4$ ($z_{sd}$=0.14 m), and the loading capacity increased from equilibrium positions $P_1$ to $P_4$. From FIG. 18(b), it was found that the resonant frequencies of the anti-vibration unit 100 in the vertical direction under equilibrium positions $P_1$, $P_2$, $P_3$ and $P_4$ were equal to 1.30 Hz, 0.84 Hz, 0.21 Hz and 0.56 Hz, and the corresponding isolation frequencies were about 1.82 Hz, 1.18 Hz, 0.30 Hz and 0.81 Hz, respectively. The resonant frequency, the isolation frequency and the resonant peak of the anti-vibration unit 100 under equilibrium position $P_3$ were much lower than those of the anti-vibration unit 100 under equilibrium positions $P_1$, $P_2$ and $P_4$, which means that the anti-vibration unit 100 with spring stiffness $k_s$=600 N/m exhibited better vibration isolation performance in the vertical direction.

Figure 19:
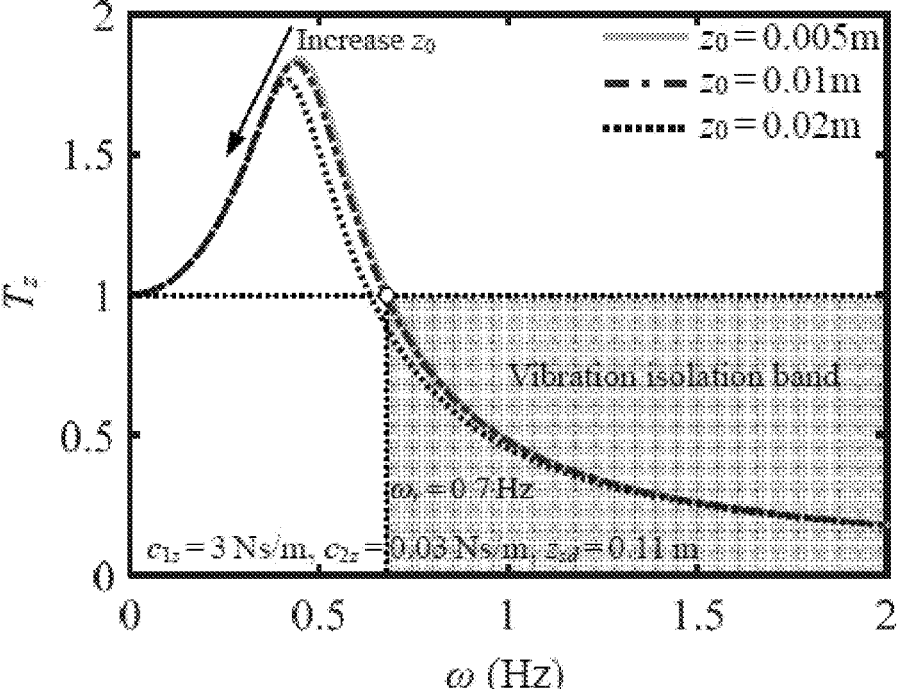
FIG. 19 is a graph of vibration isolation performance of an example anti-vibration unit in the vertical direction under different vertical base excitation amplitudes $z_0$, according to an aspect of the present disclosure.

The effect of the vertical base excitation amplitude $z_0$ on the displacement transmissibility of the anti-vibration unit 100 was investigated and the results displayed in FIG. 19. It was found that, with the increase of the base excitation amplitude $z_0$, the resonant peak decreased and the resonant frequency shifted to the left slightly. The reason for this phenomenon may be that the nonlinear damping effect of the anti-vibration unit 100 became stronger with the increase of base excitation amplitude $z_0$. When the base excitation amplitude changed, the anti-vibration unit 100 did not produce frequency jump phenomenon and softening and hardening effects that often occur in the traditional nonlinear vibration isolator, which is beneficial to enhance the stability of the anti-vibration unit 100. That is to say, the anti-vibration unit 100 showed beneficial nonlinearities rather than the unstable and bifurcation phenomena when the excitation amplitude is large.

Figure 20:
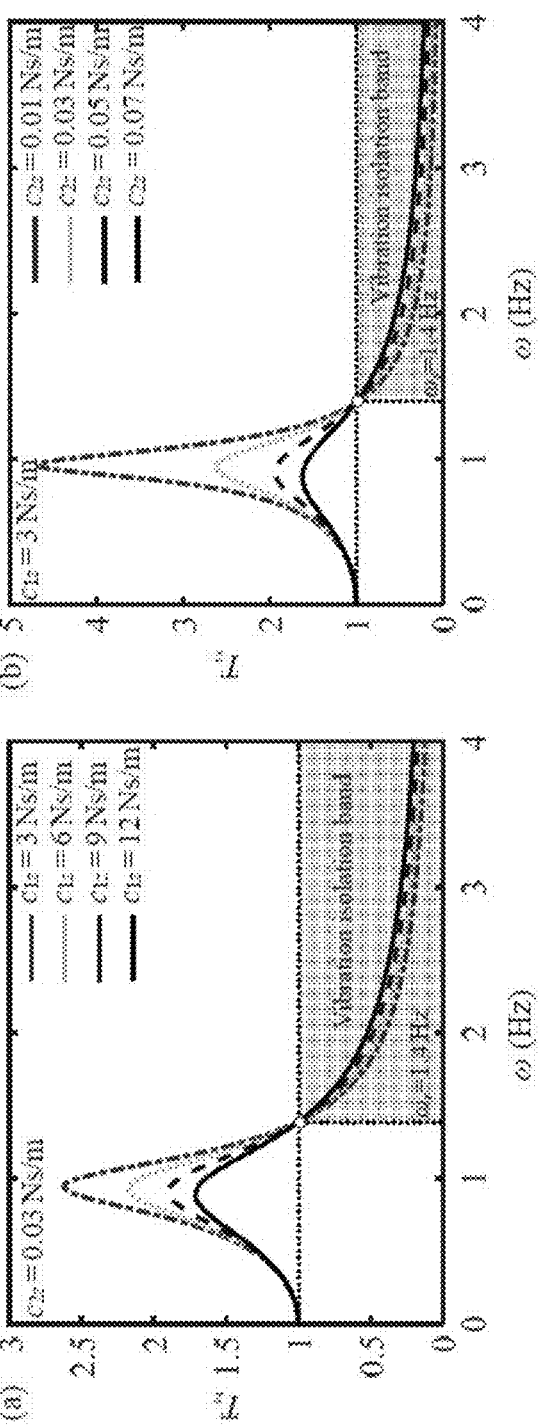
FIG. 20 shows graphs of vibration isolation performance of an example anti-vibration unit in the vertical direction under different damping coefficients (a) $c_{1z}$ and (b) $c_{2z}$, according to an aspect of the present disclosure.

The effect of the damping coefficients $c_{1z}$ and $c_{2z}$ on the vibration isolation performance of the anti-vibration unit 100 in the vertical direction was investigated. FIG. 20 shows the absolute displacement transmissibility of the anti-vibration unit 100 in the vertical direction with different damping coefficients $c_{1z}$ and $c_{2z}$. It was found that increasing damping coefficient $c_{1z}$ or $c_{2z}$ can reduce the resonant peak of the anti-vibration unit 100, but it can weaken the vibration isolation performance in the high-frequency range. Moreover, the resonant frequencies of the anti-vibration unit 100 under different damping coefficients were all equal to 0.95 Hz, and the anti-vibration unit 100 began to attenuate the vibration after 1.4 Hz, which demonstrates that the change of the damping coefficient $c_{1z}$ or $c_{2z}$ had no effect on the resonant frequency and vibration isolation frequency range of the anti-vibration unit 100.

To illustrate the better high-static and low-dynamic stiffness characteristics of the anti-vibration unit 100, a comparison with a typical spring-mass-damper (SMD) isolator, an existing traditional QZS isolator and a typical X-shaped isolator in terms of the force-displacement and stiffness curves in the vertical direction was carried out. In static stiffness analysis, the equivalent stiffness of the vertical linear springs was the same for the typical SMD isolator ($k_{s1}$=250 N/m), the traditional QZS isolator ($k_{s1}$=250 N/m, $k_{s2}$=1450 N/m, L=0.17 m, $\Delta$h=0.014 m) and the typical X-shaped isolator ($k_{s1}$=250 N/m, $k_{s2}$=1450 N/m, L=0.05 m, $\theta$=70°). For the anti-vibration unit 100 the structural parameters were $k_h$=200 N/m, $k_s$=800 N/m, $k_o$=200 N/m, $\theta_1$=2$\pi$/5, $\theta_3$=$\pi$/8, $L_1$=0.1 m, $L_2$=2$L_1$(1−cos $\theta_1$) and $L_3$=0.05 m. The comparison focused on the QZS range in the vertical direction of the four isolators, and the overall strokes of the four isolators were all equal to 0.19 m. An indicator for evaluating the QZS zone was defined to be when the vertical stiffness $K_z$ of the anti-vibration unit 100 is less than 100 N/m, the corresponding region [$z_0$, $z_1$] was defined as the QZS zone.

It was found that, for the typical SMD isolator, the relationship between the force and displacement was linear, and the stiffness curve remained unchanged at $K_z$=250 N/m. For the traditional QZS isolator, the width of the QZS zone was 0.05 m. That is to say, the QZS zone and the effective working range were relatively small for the traditional QZS isolator. In addition, the widths of the QZS zones in the vertical direction for the typical X-shaped isolator and the anti-vibration unit 100 were 0.1 m and 0.14 m, and the loading capacities corresponding to zero stiffness points were equal to 51.6 N and 53.8 N, respectively. For the anti-vibration unit 100, the proportion of the QZS zone to the total stroke in the vertical direction was equal to 73%, which is much higher than those of most typical QZS isolators. Moreover, the anti-vibration unit 100 can achieve QZS characteristics in all three directions. Therefore, compared with the typical SMD isolator, the traditional QZS isolator and the typical X-shaped isolator, the stiffness-displacement curve of the anti-vibration unit 100 was much lower and more flat in a wide displacement range, and it exhibited a wider QZS zone and larger effectively working range.

The absolute displacement transmissibility in the vertical direction for a typical SMD isolator, a traditional QZS isolator, a typical X-shaped isolator and the anti-vibration unit 100 were also compared. The points $P_1$ (z=0.05 m), $P_2$ (z=0), $P_3$ (z=0.16 m) and $P_4$ (z=0.13 m) in the QZS zones were selected as the equilibrium positions of the typical SMD isolator, the traditional QZS isolator, the typical X-shaped isolator and the anti-vibration unit 100. For the traditional QZS isolator and the anti-vibration unit 100, the stiffnesses corresponding to points $P_2$ and $P_4$ were the smallest. For the typical X-shaped isolator, the equilibrium position $P_3$ was selected at 0.03 m before the zero stiffness point to ensure the stability of the system. In addition, only air damping was considered in the comparison and the rotational friction damping of the joints in the typical X-shaped isolator and the anti-vibration unit 100 is ignored. The air damping coefficient in all four isolators was unified as $c_1$=3 Ns/m.

It was found that the resonant frequencies of the typical SMD isolator and the traditional QZS isolator were equal to 2.22 Hz and 0.42 Hz, and the corresponding resonant peaks of the displacement transmissibility were about 6.0 and 1.92. The typical SMD isolator and the traditional QZS isolator began to attenuate the vibration after 3.2 Hz and 0.63 Hz. For the typical X-shaped isolator, the resonant frequency and vibration isolation frequency $\omega_r$ were equal to 0.29 Hz and 0.43 Hz, which were lower than those of the SMD and QZS isolators. The typical X-shaped isolator exhibited vibration attenuation when the excitation frequency was greater than 0.43 Hz. In addition, for the anti-vibration unit 100, the resonant frequency was equal to 0.1 Hz, and the initial frequency corresponding to the vibration suppression was about 0.16 Hz, which indicated that the effective frequency range of vibration isolation of the anti-vibration unit 100 was much wider, and the resonant frequency was much smaller. Compared with the typical counterparts, the anti-vibration unit 100 exhibited a better vibration isolation performance, in terms of a lower resonant frequency, a wider vibration isolation range, and a lower resonant peak value.

Figure 21:
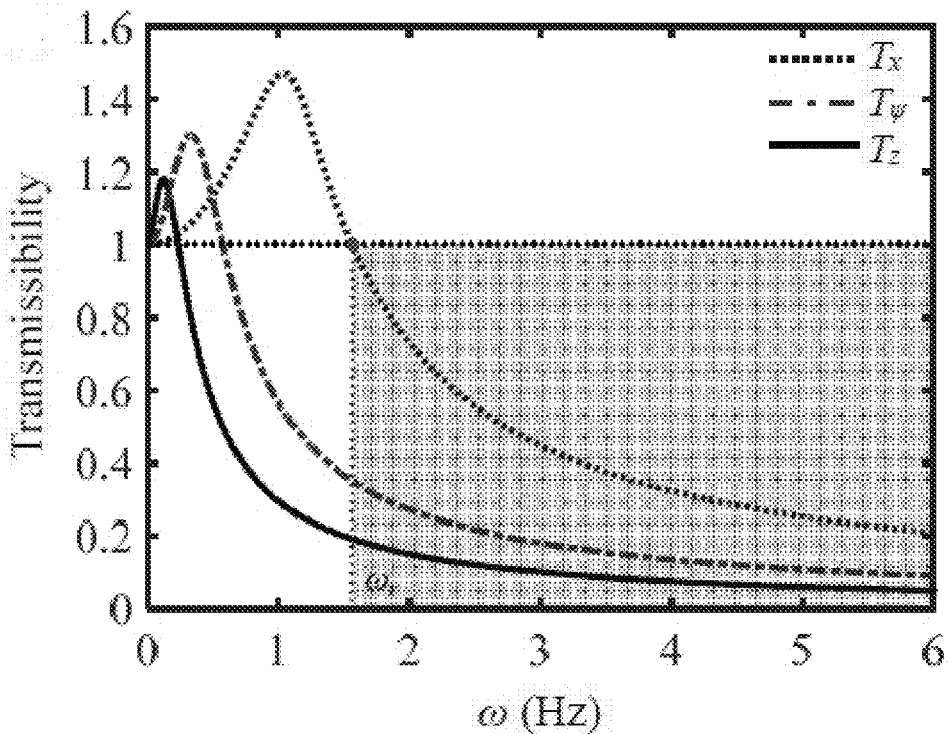
FIG. 21 is a graph of the displacement transmissibility of the example anti-vibration unit in three directions, according to an aspect of the present disclosure.

FIG. 21 illustrates the displacement transmissibility of the anti-vibration unit 100 in three directions. If the isolation object is at the geometric center of the upper bearing platform, the anti-vibration unit 100 can attenuate the vibration transmission in three directions. If the isolation object is not at the geometric center of the upper bearing platform, the isolation object on the anti-vibration unit 100 will move in the x, z and $\psi$ directions under base excitation. Due to the restriction of the support bars (e.g., the support bar 164) between the two sides of the anti-vibration unit 100, the anti-vibration unit 100 will not move in other directions except the x, z and $\psi$ directions. The corresponding vibration transmissibility curves in FIG. 21 indicate that the anti-vibration unit 100 can achieve desirable vibration isolation performance, in terms of a lower resonant frequency, a wider vibration isolation range, and a lower resonant peak value in all three directions.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention is claimed as follows:

1. An anti-vibration unit comprising:
a base member;
a first support member including a first segment at a first angle to a second segment, wherein the first support member is rotatable about a first axis, wherein the first angle is fixed;
a second support member including a third segment at a second angle to a fourth segment, wherein the second support member is rotatable about a second axis, wherein the second angle is fixed;
a first resilient member connecting the first segment of the first support member to the base member;
a third support member connected to the first support member and rotatable about the first axis;
a second resilient member connecting the third segment of the second support member to the base member; and
a fourth support member connected to the second support member and rotatable about the second axis.

2. The anti-vibration unit of claim 1, wherein the second segment of the first support member has a greater length than the first segment.

3. The anti-vibration unit of claim 1, wherein each of the first and second resilient members are rotatable about a same axis.

4. The anti-vibration unit of claim 1, wherein the first axis extends through a point at which the first segment meets the second segment of the first support member, and wherein the second axis extends through a point at which the third segment meets the fourth segment of the second support member.

5. The anti-vibration unit of claim 1, wherein the first support member is rotatably connected to the base member at a first joint through which the first axis extends, and wherein the second support member is rotatably connected to the base member at a second joint through which the second axis extends.

6. The anti-vibration unit of claim 1, wherein the base member is a first base member, the anti-vibration unit further comprising a second base member,
wherein the third support member is rotatably connected to the second base member at a third joint and to the second segment of the first support member at a fourth joint, and
wherein the fourth support member is rotatably connected to the second base member at a fifth joint and to the fourth segment of the second support member at a sixth joint.

7. The anti-vibration unit of claim 6, further comprising:
a fifth support member rotatably connected to the second base member at the third joint; and
a sixth support member rotatably connected to the second base member at the fifth joint, wherein the fifth support member crosses over the sixth support member at a first crossover point.

8. The anti-vibration unit of claim 7, further comprising:
a seventh support member rotatably connected to the fifth support member at a sixth joint, wherein the seventh support member is rotatable about the first axis; and
an eighth support member rotatably connected to the sixth support member at a seventh joint, wherein the eighth support member is rotatable about the second axis.

9. An anti-vibration unit comprising:
a base member;
a first support member including a first segment at a first angle to a second segment, wherein the first support member is rotatable about a first axis, wherein the first angle is fixed;
a second support member including a third segment at a second angle to a fourth segment, wherein the second support member is rotatable about a second axis, wherein the second angle is fixed;
a first resilient member connecting the first segment of the first support member to the base member, wherein the first resilient member is rotatable about a third axis; and
a second resilient member connecting the third segment of the second support member to the base member, wherein the second resilient member is rotatable about the third axis.

10. The anti-vibration unit of claim 9, wherein the second segment of the first support member has a greater length than the first segment.

11. The anti-vibration unit of claim 9, wherein the first axis extends through a point at which the first segment meets the second segment of the first support member, and wherein the second axis extends through a point at which the third segment meets the fourth segment of the second support member.

12. The anti-vibration unit of claim 9, wherein the first support member is rotatably connected to the base member at a first joint through which the first axis extends, and wherein the second support member is rotatably connected to the base member at a second joint through which the second axis extends.

13. The anti-vibration unit of claim 9, further comprising:

a third support member rotatably connected to the second segment of the first support member at a third joint; and a fourth support member rotatably connected to the fourth segment of the second support member at a fourth joint.

14. The anti-vibration unit of claim 9, further comprising:

a third support member rotatable about the first axis; and a fourth support member rotatable about the second axis.

* * * * *